United States Patent
Kluever et al.

(10) Patent No.: US 10,107,929 B2
(45) Date of Patent: Oct. 23, 2018

(54) METHODS AND SYSTEMS TO DETERMINE GHOST OPERATORS FROM MARINE SEISMIC DATA

(71) Applicant: PGS Geophysical AS, Oslo (NO)

(72) Inventors: Tilman Kluever, Oslo (NO); Hocine Tabti, Oslo (NO)

(73) Assignee: PGS GEOPHYSICAL AS, Oslo (NO)

( * ) Notice: Subject to any disclaimer, the term of this patent is extended or adjusted under 35 U.S.C. 154(b) by 75 days.

(21) Appl. No.: 14/974,238

(22) Filed: Dec. 18, 2015

(65) Prior Publication Data

US 2016/0178774 A1    Jun. 23, 2016

Related U.S. Application Data

(60) Provisional application No. 62/093,834, filed on Dec. 18, 2014, provisional application No. 62/103,617, filed on Jan. 15, 2015.

(51) Int. Cl.
*G01V 1/36*  (2006.01)
*G01V 1/38*  (2006.01)

(52) U.S. Cl.
CPC .......... *G01V 1/38* (2013.01); *G01V 1/36* (2013.01); *G01V 2210/44* (2013.01); *G01V 2210/56* (2013.01)

(58) Field of Classification Search
CPC ........ G01V 1/38; G01V 1/36; G01V 2210/44; G01V 2210/56; G01V 2210/532
USPC ............................... 367/21, 24, 151; 702/14
See application file for complete search history.

(56) References Cited

U.S. PATENT DOCUMENTS

| | | | | |
|---|---|---|---|---|
| 6,529,445 B1 * | 3/2003 | Laws | ..................... | G01V 1/364 367/151 |
| RE41,656 E * | 9/2010 | Robertsson | ............ | G01V 1/364 367/24 |
| 7,872,942 B2 * | 1/2011 | Sollner | ..................... | G01V 1/38 367/21 |
| RE43,188 E * | 2/2012 | Robertsson | ............ | G01V 1/364 367/24 |
| 9,229,123 B2 * | 1/2016 | Pan | ......................... | G01V 1/36 |
| 9,360,576 B2 * | 6/2016 | Frijlink | ................ | G01V 1/3808 |
| 2016/0084977 A1 * | 3/2016 | Rickett | ................... | G01V 1/364 702/17 |
| 2016/0202376 A1 * | 7/2016 | Moseley | ................ | G01V 1/364 702/17 |

FOREIGN PATENT DOCUMENTS

WO    WO-2016113589 A1 *    7/2016    ............... G01V 1/36

\* cited by examiner

*Primary Examiner* — Daniel L Murphy

(57) ABSTRACT

Methods and systems to determine ghost operators from marine seismic data are described. Methods and systems extract statistical information about the free surface from N gathers of pressure and vertical velocity data obtained for N activates of a source. Ghost operators are calculated from the N gathers of pressure and vertical velocity data. The ghost operators may be used to characterize the actual source and receiver ghosts recorded in the seismic data, compute properties of the free surface, such a reflection coefficient and root mean square free surface height, and may be used to deghost pressure and vertical velocity data.

22 Claims, 29 Drawing Sheets

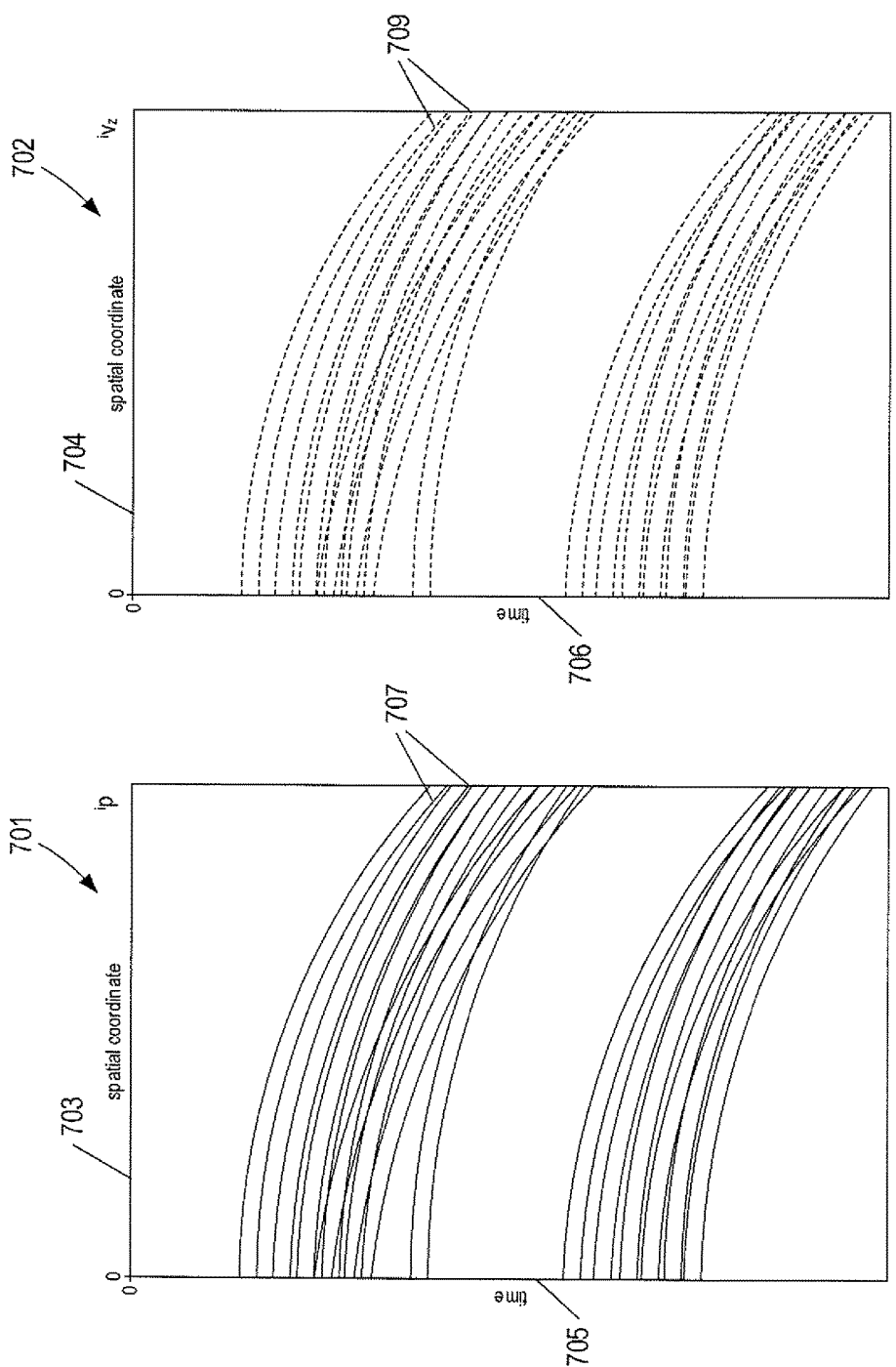

METHODS AND SYSTEMS TO DETERMINE GHOST OPERATORS FROM MARINE SEISMIC DATA

CROSS-REFERENCE TO A RELATED APPLICATION

This application claims the benefit of Provisional Application 62/093,834, filed Dec. 18, 2014 and Provisional Application 62/103,617 filed on Jan. 15, 2015.

BACKGROUND

In recent years, the petroleum industry has invested heavily in the development of improved marine survey techniques and seismic data processing methods in order to increase the resolution and accuracy of seismic images of subterranean formations. Marine surveys illuminate a subterranean formation located beneath a body of water with acoustic energy produced by one or more submerged seismic sources. A source may be composed of an array of source elements, such as air guns or marine vibrators. The acoustic energy may travel down through the water and into the subterranean formation. At each interface between different types of rock or sediment of the subterranean formation a portion of the acoustic energy may be refracted, a portion may be transmitted, and a portion may be reflected back toward the subterranean formation surface and into the body of water. A typical marine survey is carried out with a survey vessel that passes over the illuminated subterranean formation while towing elongated cable-like structures called streamers. Some marine surveys utilize receivers attached to ocean bottom nodes or cables, either in conjunction with, or in lieu of, receivers on towed streamers. The streamers may be equipped with a number of collocated, pressure and particle motion sensors that detect pressure and particle motion wavefields, respectively, associated with the acoustic energy reflected back into the water from the subterranean formation. The pressure sensors generate seismic data that represents the pressure wavefield and the particle motion sensors generate seismic data that represents the particle motion (e.g., particle displacement, particle velocity, or particle acceleration) wavefield.

However, techniques used to determine the structure and composition of a subterranean formation from marine seismic data often depend on assumptions about the marine survey conditions. For example, typical marine data processing techniques assume a flat free surface with a reflection coefficient of −1. However, the flat free surface assumption is not a valid assumption in cases where marine seismic data is collected under rough sea conditions. Those working in marine seismology continue to seek methods and systems to extract information from marine seismic data that more accurately account for changing conditions in a marine survey.

DESCRIPTION OF THE DRAWINGS

FIGS. 7A and 7B show examples of common-shot gathers of pressure data and vertical velocity data.

DETAILED DESCRIPTION

Methods and systems are directed to determining ghost operators from marine seismic data. In particular, methods and systems described below extract statistical information about the free surface from N gathers of pressure and vertical velocity data obtained for N source activations. Methods compute receiver-side and source-side ghost operators from the N gathers of pressure and vertical velocity data. The ghost operators may be used to characterize the actual source and receiver ghosts recorded in the seismic data, compute properties of the free surface, such as a free-surface reflection coefficient and root mean square free surface height, and may be used to deghost the pressure and vertical velocity data.

Figure 1A:
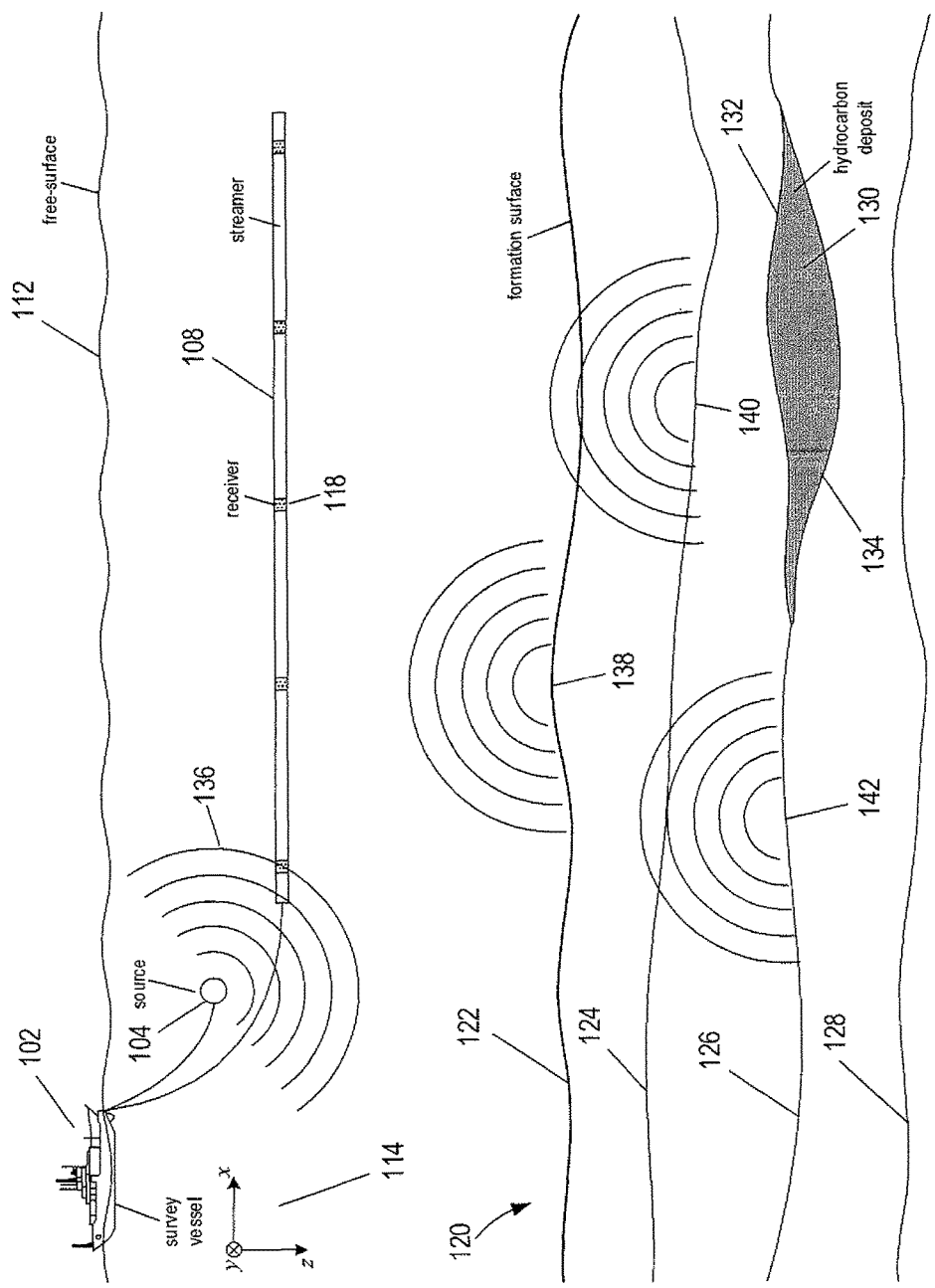
FIGS. 1A-1B show side-elevation and top views of an example seismic data acquisition system.
Figure 1B:
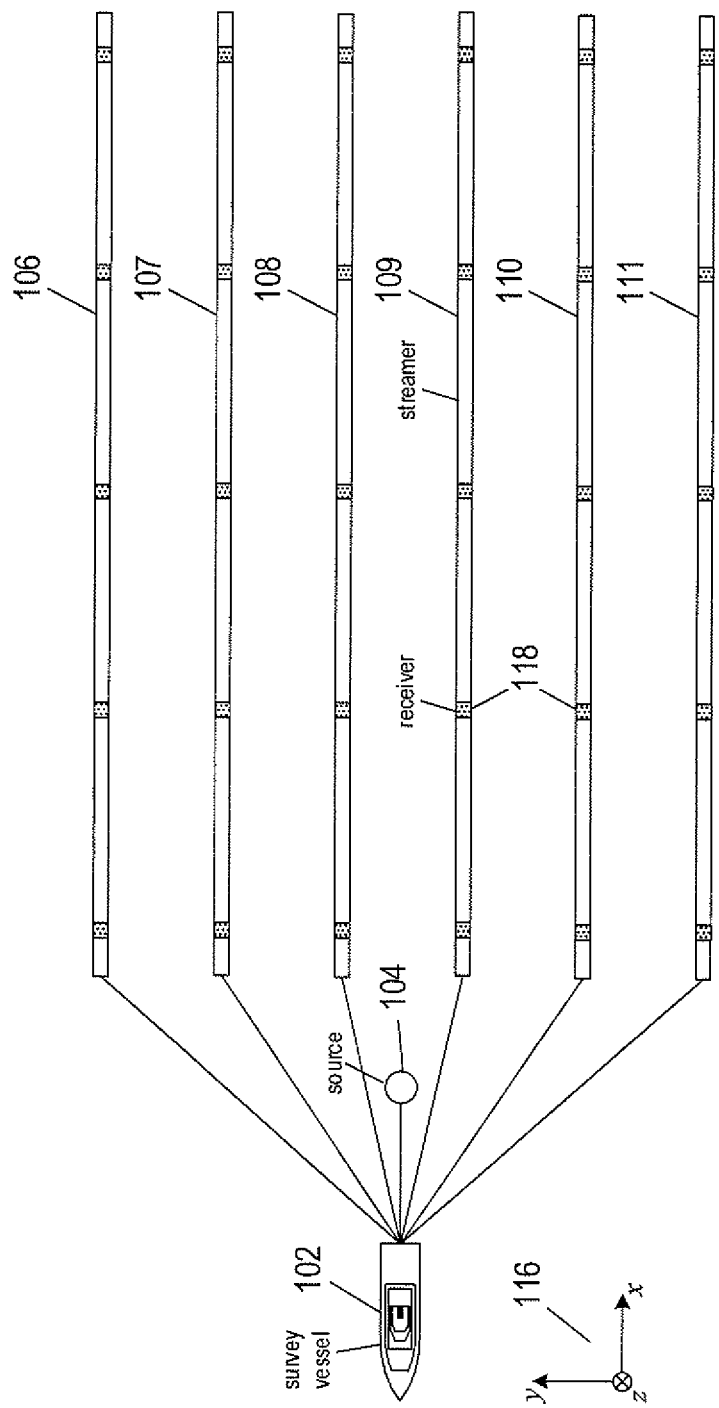

FIGS. 1A-1B show side-elevation and top views, respectively, of an example seismic data acquisition system composed of a survey vessel 102 towing a source 104 and six separate streamers 106-111 beneath a free surface 112 of a body of water. The body of water can be, for example, an ocean, a sea, a lake, or a river, or any portion thereof. In this example, each streamer is attached at one end to the survey vessel 102 via a streamer-data-transmission cable. The illustrated streamers 106-111 form a planar horizontal data acquisition surface with respect to the free surface 112. However, in practice, the data acquisition surface may be smoothly varying due to active sea currents and weather conditions. In other words, although the streamers 106-111 are illustrated in FIGS. 1A and 1B and subsequent figures as straight and substantially parallel to the free surface 112, in practice, the towed streamers may undulate as a result of dynamic conditions of the body of water in which the streamers are submerged. A data acquisition surface is not limited to having a planar horizontal orientation with respect to the free surface 112. The streamers may be towed at depths that angle the data acquisition surface with respect to the free surface 112 or one or more of the streamers may be towed at different depths. A data acquisition surface is not limited to six streamers as shown in FIG. 1B. In practice, the number of streamers used to form a data acquisition surface can range from as few as one streamer to as many as 20 or more streamers. It should also be noted that the number of sources is not limited to a single source. In practice, the number of sources selected to generate acoustic energy may range from as few as one source to three or more sources and the sources may be towed in groups by one or more vessels.

FIG. 1A includes an xz-plane 114 and FIG. 1B includes an xy-plane 116 of the same Cartesian coordinate system having three orthogonal, spatial coordinate axes labeled x, y and z. The coordinate system is used to specify orientations and coordinate locations within the body of water. The x-direction specifies the position of a point in a direction parallel to the length of the streamers (or a specified portion thereof when the length of the streamers are curved) and is referred to as the "in-line" direction. The y-direction specifies the position of a point in a direction perpendicular to the x-axis and substantially parallel to the free surface 112 and is referred to as the "cross-line" direction. The z-direction specifies the position of a point perpendicular to the xy-plane (i.e., perpendicular to the free surface 112) with the positive z-direction pointing downward away from the free surface 112. The streamers 106-111 are long cables containing power and data-transmission lines that connect receivers represented by shaded rectangles, such as receiver 118, spaced-apart along the length of each streamer to seismic acquisition equipment and data-storage devices located on board the survey vessel 102.

Streamer depth below the free surface 112 can be estimated at various locations along the streamers using depth-measuring devices attached to the streamers. For example, the depth-measuring devices can measure hydrostatic pressure or utilize acoustic distance measurements. The depth-measuring devices can be integrated with depth controllers, such as paravanes or water kites that control and maintain the depth and position of the streamers as the streamers are towed through the body of water. The depth-measuring devices are typically placed at intervals (e.g., about 300 meter intervals in some implementations) along each streamer. Note that in other implementations buoys may be attached to the streamers and used to maintain the orientation and depth of the streamers below the free surface 112.

FIG. 1A shows a cross-sectional view of the survey vessel 102 towing the source 104 above a subterranean formation 120. Curve 122, the formation surface, represents a top surface of the subterranean formation 120 located at the bottom of the body of water. The subterranean formation 120 may be composed of a number of subterranean layers of sediment and rock. Curves 124, 126, and 128 represent interfaces between subterranean layers of different compositions. A shaded region 130, bounded at the top by a curve 132 and at the bottom by a curve 134, represents a subterranean hydrocarbon deposit, the depth and positional coordinates of which may be determined, at least in part, by analysis of seismic data collected during a marine seismic survey. As the survey vessel 102 moves over the subterranean formation 120, the source 104 may be activated to produce an acoustic signal at spatial and/or temporal intervals. Activation of the source 104 is often called a "shot." In other implementations, the source 104 may be towed by one survey vessel and the streamers may be towed by a different survey vessel. The source 104 may be an air gun, marine vibrator, or composed of an array of air guns and/or marine vibrators. FIG. 1A illustrates an acoustic signal expanding outward from the source 104 as a pressure wavefield 136 represented by semicircles of increasing radius centered at the source 104. The outwardly expanding wavefronts from the sources may be spherical but are shown in vertical plane cross section in FIG. 1A. The outward and downward expanding portion of the pressure wavefield 136 and any portion of the pressure wavefield 136 reflected from the free-surface 112 are called the "source wavefield." The source wavefield eventually reaches the formation surface 122 of the subterranean formation 120, at which point the source wavefield may be partially reflected from the formation surface 122 and partially refracted downward into the subterranean formation 120, becoming elastic waves within the subterranean formation 120. In other words, in the body of water, the acoustic signal is composed primarily of compressional pressure waves, or P-waves, while in the subterranean formation 120, the waves include both P-waves and transverse waves, or S-waves. Within the subterranean formation 120, at each interface between different types of materials or at discontinuities in density or in one or more of various other physical characteristics or parameters, downward propagating waves may be partially reflected and partially refracted. As a result, each point of the formation surface 122 and each point of the interfaces 124, 126, and 128 may be a reflector that becomes a potential secondary point source from which acoustic and elastic wave energy, respectively, may emanate upward toward the receivers 118 in response to the acoustic signal generated by the source 104 and downward-propagating elastic waves generated from the pressure impulse. As shown in FIG. 1A, waves of significant amplitude may be generally reflected from points on or close to the formation surface 122, such as point 138, and from points on or very close to interfaces in the subterranean formation 120, such as points 140 and 142. The upward expanding waves reflected from the subterranean formation 120 are collectively the "reflected wavefield."

The waves that compose the reflected wavefield may be generally reflected at different times within a range of times following the initial source wavefield. A point on the formation surface 122, such as the point 138, may receive a pressure disturbance from the source wavefield more quickly than a point within the subterranean formation 120, such as points 140 and 142. Similarly, a point on the formation surface 122 directly beneath the source 104 may receive the pressure disturbance sooner than a more distant-lying point on the formation surface 122. Thus, the times at which waves are reflected from various points within the subterranean formation 120 may be related to the distance, in three-dimensional space, of the points from the activated source 104.

Acoustic and elastic waves, however, may travel at different velocities within different materials as well as within the same material under different pressures. Therefore, the travel times of the source wavefield and reflected wavefield may be functions of distance from the source 104 as well as the materials and physical characteristics of the materials through which the wavefields travel. In addition, expanding wavefronts of the wavefields may be altered as the wavefronts cross interfaces and as the velocity of sound varies in the media traversed by the wavefront. The superposition of waves reflected from within the subterranean formation 120 in response to the source wavefield may be a generally complicated wavefield that includes information about the shapes, sizes, and material characteristics of the subterranean formation 120, including information about the shapes, sizes, and locations of the various reflecting features within the subterranean formation 120 of interest to exploration seismologists.

Figure 2:
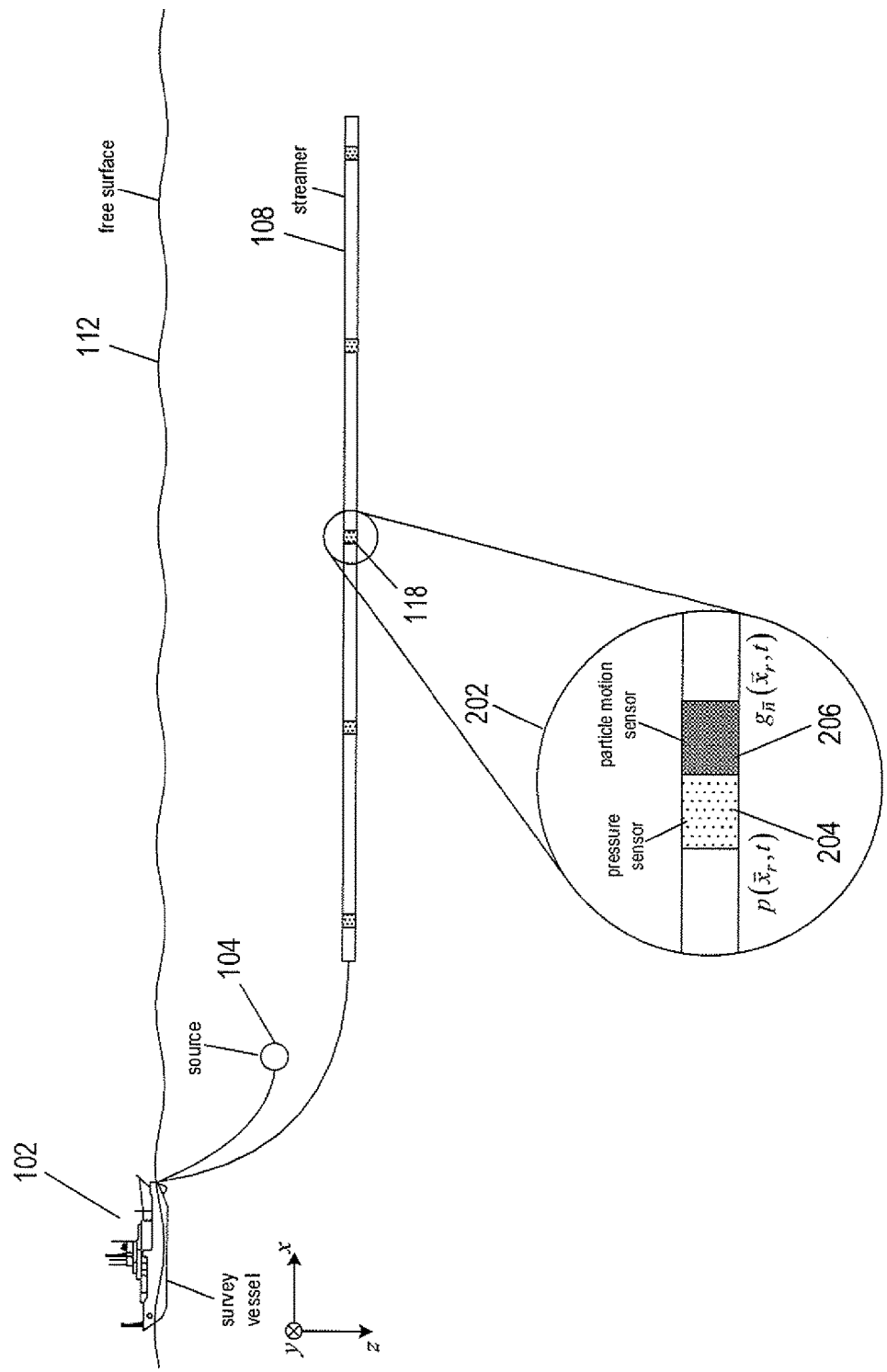
FIG. 2 shows a side-elevation view of a seismic data acquisition system with a magnified view of a receiver.

Each receiver 118 may be a multi-component sensor including particle motion sensors and a pressure sensor. A pressure sensor detects variations in water pressure over time. The term "particle motion sensor" is a general term used to refer to a sensor that may be configured to detect particle displacement, particle velocity, or particle acceleration over time. FIG. 2 shows a side-elevation view of the marine seismic data acquisition system with a magnified view 202 of the receiver 118. In this example, the magnified view 202 reveals that the receiver 118 is a multi-component sensor composed of a pressure sensor 204 and a particle motion sensor 206. The pressure sensor may be, for example, a hydrophone. Each pressure sensor may measure changes in hydrostatic pressure over time to produce pressure data denoted by $p(\vec{x}_r, t)$, where $\vec{x}_r$ represents the Cartesian coordinates $(x_r, y_r, z_r)$ of a receiver, subscript r is a receiver index, and t represents time. The particle motion sensors may be responsive to water motion. In general, particle motion sensors detect particle motion (i.e., displacement, velocity, or acceleration) in a particular direction and may be responsive to such directional displacement of the particles, velocity of the particles, or acceleration of the particles. A particle motion sensor that measures particle displacement generates particle displacement data denoted by $g_{\vec{n}}(\vec{x}_r, t)$, where the vector $\vec{n}$ represents the direction along which particle displacement is measured. A particle motion sensor that measures particle velocity (i.e., particle velocity sensor) generates particle velocity data denoted by $v_{\vec{n}}(\vec{x}_r, t)$. A particle motion sensor that measures particle acceleration (i.e., accelerometer) generates particle acceleration data denoted by $a_{\vec{n}}(\vec{x}_r, t)$. The data generated by one type of particle motion sensor may be converted to another type. For example, particle displacement data may be differentiated to obtain particle velocity data, and particle acceleration data may be integrated to obtain particle velocity data.

The term "particle motion data" is a general term used to refer to particle displacement data, particle velocity data, or particle acceleration data, and the term "seismic data" is used to refer to pressure data and/or particle motion data. The pressure data represents a pressure wavefield, particle displacement data represents a particle displacement wavefield, particle velocity data represents a particle velocity wavefield, and particle acceleration data represents particle acceleration wavefield. The particle displacement, velocity, and acceleration wavefields are referred to as particle motion wavefields.

The particle motion sensors are typically oriented so that the particle motion is measured in the vertical direction (i.e., $\vec{n}=(0,0,z)$) in which case $g_z(\vec{x}_r,t)$ is called vertical displacement data, $v_z(\vec{x}_r,t)$ is called vertical velocity data, and $a_z(\vec{x}_r,t)$ is called vertical acceleration data. Alternatively, each receiver may include two additional particle motion sensors that measure particle motion in two other directions, $\vec{n}_1$ and $\vec{n}_2$, that are orthogonal to $\vec{n}$ (i.e., $\vec{n} \cdot \vec{n}_1 = \vec{n} \cdot \vec{n}_2 = 0$, where "·" is the scalar product) and orthogonal to one another (i.e., $\vec{n}_1 \cdot \vec{n}_2 = 0$). In other words, each receiver may include three particle motion sensors that measure particle motion in three orthogonal directions. For example, in addition to having a particle motion sensor that measures particle velocity in the z-direction to give $v_z(\vec{x}_r,t)$, each receiver may include a particle motion sensor that measures the wavefield in the in-line direction in order to obtain the inline velocity data, $v_x(\vec{x}_r,t)$, and a particle motion sensor that measures the wavefield in the cross-line direction in order to obtain the cross-line velocity data, $v_y(\vec{x}_r,t)$. In certain implementations, the receivers may by composed of only pressure sensors, and in other implementations, the receivers may be composed of only particle motion sensors.

The streamers 106-111 and the survey vessel 102 may include sensing electronics and data-processing facilities that allow seismic data generated by each receiver to be correlated with the time the source 104 is activated, absolute positions on the free surface 112, and absolute three-dimensional positions with respect to an arbitrary three-dimensional coordinate system. The pressure data and particle motion data may be stored at the receiver, and/or may be sent along the streamers and data transmission cables to the survey vessel 102, where the data may be stored electronically or magnetically on data-storage devices located onboard the survey vessel 102 and/or transmitted onshore to a seismic data-processing facility.

Each pressure sensor and particle motion sensor may include an analog-to-digital converter that converts time-dependent analog signals into discrete time series that consist of a number of consecutively measured values called "amplitudes" separated in time by a sample rate. The time series data generated by a pressure or particle motion sensor is called a "trace," which may consist of thousands of samples collected at a typical sample rate of about 1 to 5 samples per ms. A trace is a recording of a subterranean formation response to acoustic energy that passes from an activated source, into the subterranean formation where a portion of the acoustic energy is reflected and/or refracted, and ultimately detected by a sensor as described above. A trace records variations in a time-dependent amplitude that corresponds to fluctuations in acoustic energy of the wavefield measured by the sensor. In general, each trace is an ordered set of discrete spatial and time-dependent pressure or motion sensor amplitudes denoted by:

$$tr(t, \vec{x}_r, \vec{x}_s) = \{A(t, \vec{x}_r, \vec{x}_r)\}_{j=0}^{J-1} \quad (1)$$

where
- tr represents pressure, particle displacement, particle velocity, or particle acceleration amplitude;
- A represents amplitude;
- $t_j$ is the jth sample time; and
- J is the number of time samples in the trace.

The coordinate location $\vec{x}_r$ of each receiver may be calculated from global position information obtained from one or more global positioning devices located along the streamers, survey vessel, and buoys and the known geometry and arrangement of the streamers and receivers. The coordinate location $\vec{x}_s$ of each source within the source array 104 may also be obtained from one or more global positioning devices located at each source and the know geometry and arrangement of the sources within the source array 104. Each trace also includes a trace header not represented in Equation (1) that identifies the specific receiver that generated the trace, receiver and source GPS spatial coordinates, and may include time sample rate and the number of time samples.

As explained above, the reflected wavefield typically arrives first at the receivers located closest to the sources. The distance from the sources to a receiver is called the "source-receiver offset," or simply "offset." A larger offset generally results in a longer arrival time delay. The traces are collected to form a "gather" that can be further processed using various seismic data processing techniques in order to obtain information about the structure of the subterranean formation. The traces may be sorted into different domains, such as a common-shot domain, common-receiver domain, common-receiver-station domain, and common-midpoint domain. For example, a collection of traces sorted into the common-shot domain are called a common-shot gather and a collection of traces sorted into common-receiver domain are called a common-receiver gather.

Figure 3:
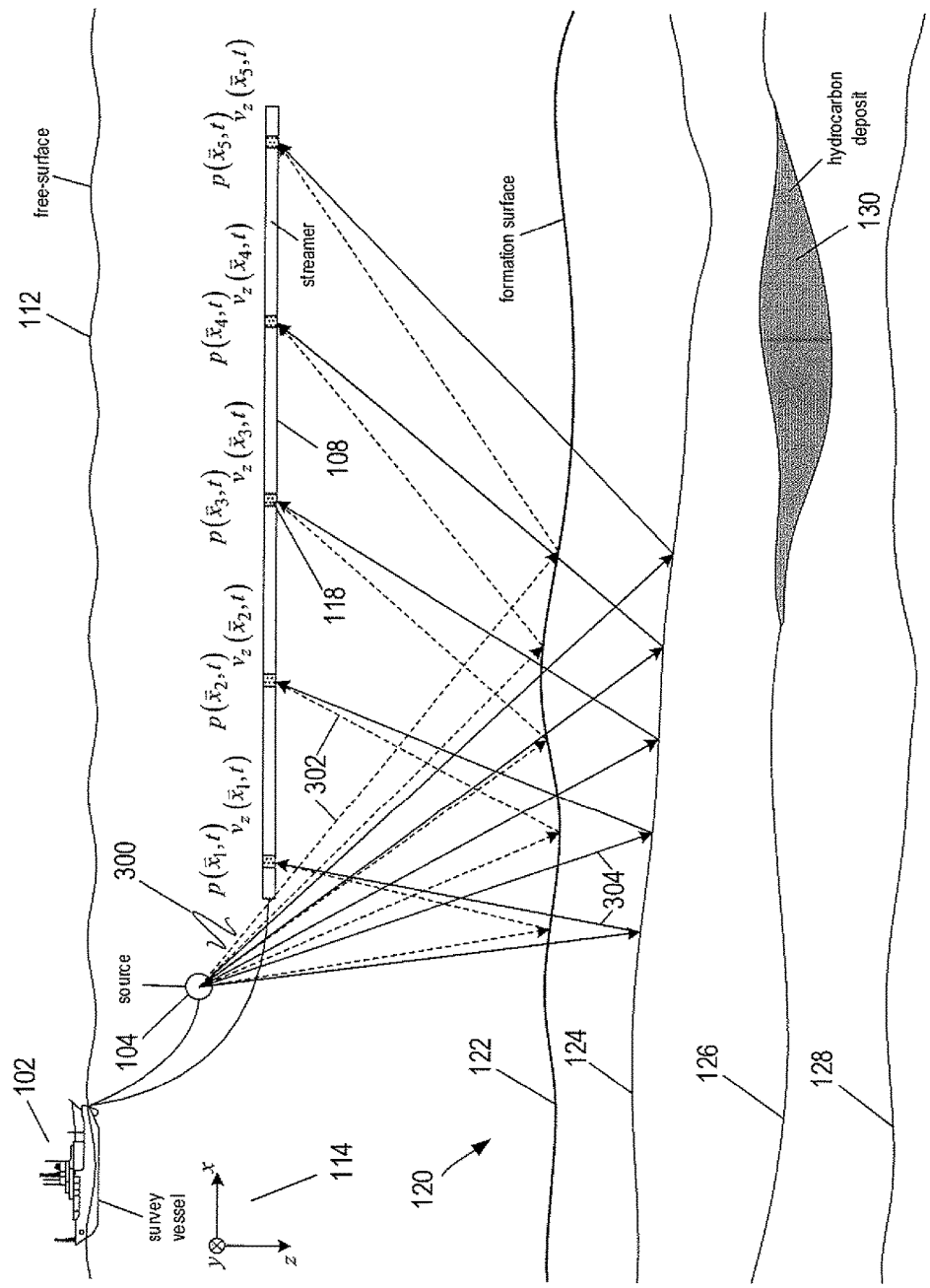
FIG. 3 shows example ray paths that represent paths of an acoustic signal that travels from a source into a subterranean formation.

FIG. 3 shows example ray paths of an acoustic signal 300 that travels from the source 104 into the subterranean formation 120. Dashed-line rays, such as rays 302, represent acoustic energy reflected from the formation surface 122 to the receivers 118 located along the streamer 108, and solid-line rays, such as rays 304, represent acoustic energy reflected from the interface 124 to the receivers 118 located along the streamer 108. Note that for simplicity of illustration a small number of ray paths are represented. In the example of FIG. 3, the particle motion sensors located at each receiver 118 measure vertical particle velocity of the wavefield emanating from the subterranean formation 120 in response to the acoustic signal 300. The pressure data and vertical velocity data generated at each receiver 118 may be time sampled and recorded as separate traces. In the example of FIG. 3, the collection of traces generated by the receivers 118 along the streamer 108 for a single activation of the source 104 may be collected to form a "common-shot gather." The traces generated by the receivers located along each of the other five streamers for the same activation may be collected to foliii separate common-shot gathers, each gather associated with one of the streamers.

Figure 4:
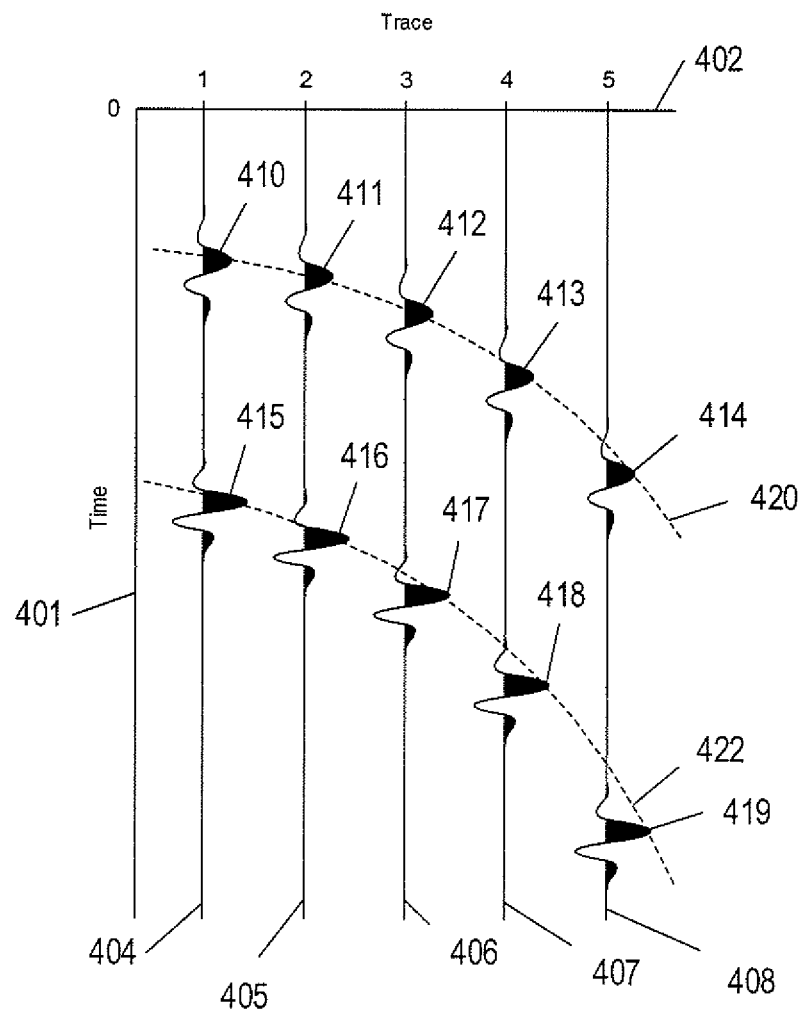
FIG. 4 shows a plot of a synthetic common-shot gather composed of example traces.

FIG. 4 shows a plot of a common-shot gather composed of example traces of the reflected wavefield measured by the five receivers located along the streamer 108 shown in FIG. 3. Vertical axis 401 represents time. Horizontal axis 402 represents trace numbers with trace "1" representing the seismic data generated by the receiver 118 located closest to the source 104 and trace "5" representing the seismic data generated by the receiver 118 located farthest away from the source 104. The traces 404-408 may represent variation in the amplitude of either the pressure data or the particle motion data measured by corresponding sensors of the five receivers 118. The example traces include wavelets or pulses 410-419 that represent the portion of the wavefield reflected from the formation surface 122 and measured by the pressure sensors or particle motion sensors. Peaks, colored black, and troughs of each trace represent changes in the amplitude. The distances along the traces 404-408 from time zero to the wavelets 410-414 represent two-way travel time of the acoustic energy output from the source 104 to the formation surface 122 and to the receivers 118 located along the streamer 108. Wavelets 415-419 represent longer two-way travel time of the acoustic energy output from the source 104 to the interface 124 and to the same receivers 118 located along the streamer 108. The amplitude of the peak or trough of the wavelets 410-419 indicates the magnitude of the reflected acoustic energy recorded by the receivers 118.

The arrival times versus source-receiver offset is generally longer with increasing source-receiver offset. As a result, the wavelets that correspond a formation surface, or a subterranean interface, are collectively called a "reflected wave" that tracks a curve. For example, curve 420 represents the distribution of the wavelets 410-414 reflected from the formation surface 122, which is called a formation-surface reflected wave, and curve 422 represents the distribution of the wavelets 415-419 from the interface 124, which is called an interface reflected wave.

Ideally, the acoustic energy of an acoustic signal output from the source 104 travels directly from the source 104 to the subterranean formation 120 and is reflected back to the receivers 118 as shown in FIG. 3. In practice, however, the acoustic energy spreads out radially from the source 104, as described above with reference to FIG. 1A, and because the free surface of a body of water reflects acoustic energy, "ghost" effects created by free-surface reflections contaminate seismic data generated by the receivers. The ghost effects result from portions of the acoustic energy being reflected from the free surface 112 before reaching the receivers 118 and from acoustic energy that travels upward from the subterranean formation 120 and is reflected from the free surface 112 before reaching the receivers 118. As a result, the receivers 118 measure not only portions of the reflected wavefields that travel directly from the subterranean formation 120 to the receivers 118 but also measure time-delayed (i.e., ghost) wavefields created by reflections from the free surface 112. The two types of ghost that are typically considered are a source-side ghost and a receiver-side ghost. The source-side ghost contains information about the shape of the subterranean-formation surface and interfaces within the subterranean formation and contains information about the actual shape and properties of the free surface above the source position. On the other hand, the receiver-side ghost contains information about the state of the free surface at, or close to, the time the reflected wavefields are recorded.

Figure 5:
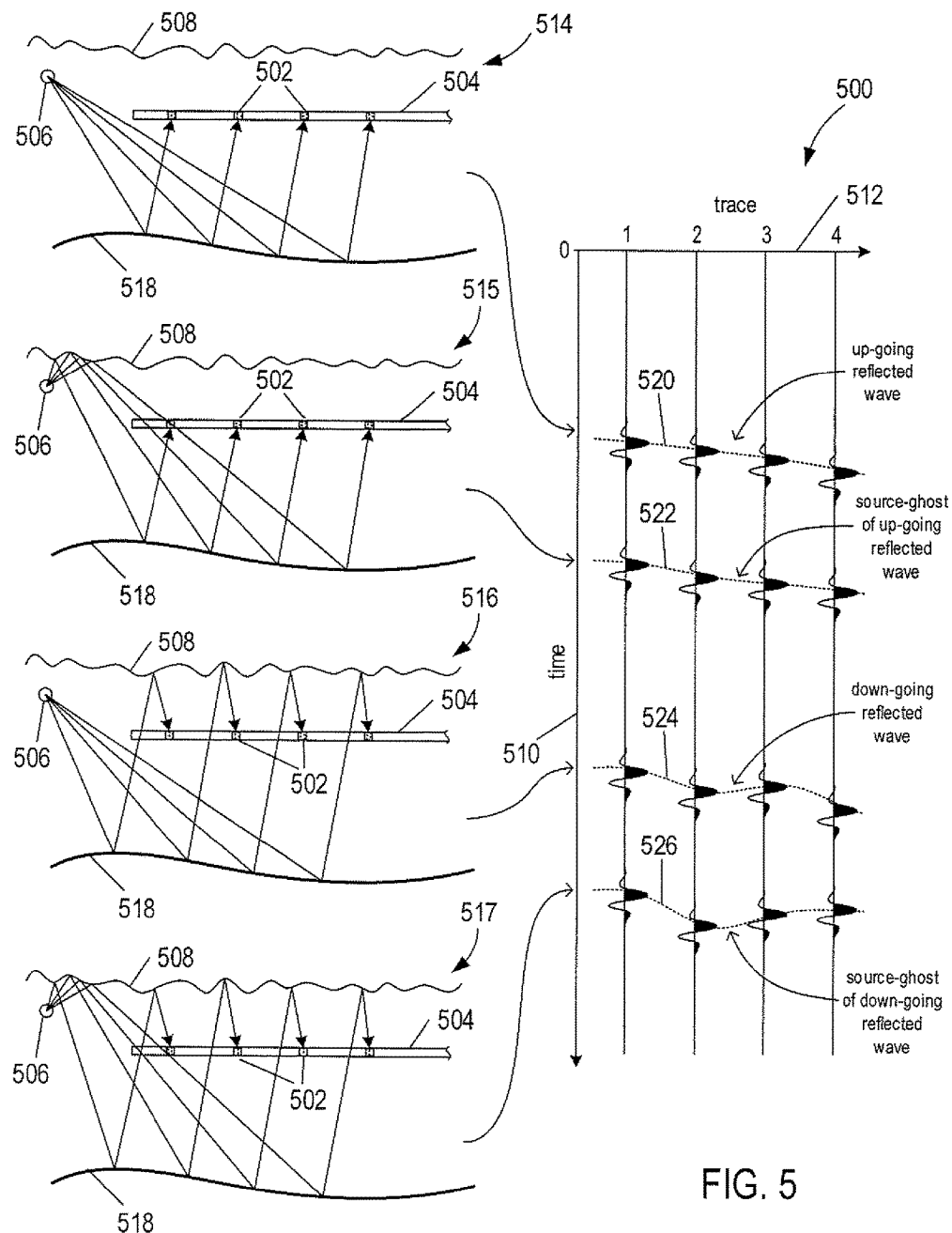
FIG. 5 shows a plot of formation-surface reflected waves of a common-shot gather and corresponding reflections from a formation surface.

FIG. 5 shows a plot of four example traces of a common-shot gather 500 within a time window that captures only formation-surface reflected waves. The four example traces are generated by four receivers 502 of a streamer 504 located closest to a source 506 beneath a free surface 508. Axis 510 represents time, and axis 512 represents trace numbers (i.e., channels) with trace "1" representing the seismic data generated by the receiver 502 located closest to the source 506 and trace "4" representing the seismic data generated by the receiver 502 located farther away from the source 506.

FIG. 5 also shows snapshots 514-517 of four different ways in which acoustic energy generated by a single activation of the source 506 is reflected from a formation surface 518 before reaching the four receivers 502. Snapshot 514 shows a direct path in which a portion of the acoustic energy travels directly from the source 506 to the formation surface 518 then to the receivers 502, which results in the earliest recorded wavelets located along dotted curve 520 in the time window. Snapshot 515 shows a first indirect path in which another portion of the acoustic energy travels from the source 506 to the free surface 508 then to the formation surface 518 and finally to the receivers 502. This first indirect path is recorded later in time as wavelets located along dotted curve 522. Snapshot 516 shows a second indirect path in which another portion of the acoustic energy travels from the source 506 to the formation surface 518 then to the free surface 508 before reaching the receivers 502. This second indirect path is recorded later in time than the first indirect path as wavelets located along dotted curve 524. Snapshot 517 shows a third indirect path in which the acoustic energy travels from the source 506 to the free surface 508 then to the formation surface 518 and back to the free surface 508 before reaching the receivers 502. This third indirect path is recorded later in time than the second indirect path as wavelets located along dotted curve 526. In the example of FIG. 5, the source-ghost of the up-going reflected wave 522 arrives at the receivers 502 before the down-going reflected wave 524, because the source 506 is shallower than the streamer 504. On the other hand, when the source 506 is located deeper than the streamer 504 (not shown), the down-going reflected wave 524 arrives at the receivers 502 before the source-ghost of the up-going reflected wave 522.

The wavelets located along curve 520 represent a direct "up-going" reflected wave. The wavelets located along the curve 522 represent the "source-ghost" of the direct up-going reflected wave. The wavelets located along the curve 524 represent a "down-going" reflected wave, which may also be called a "receiver-ghost" reflected wave. The wavelets located along the curve 526 represent the "source-ghost" of the down-going reflected wave. The direct up-going reflected wave 520 contains only information about the shape of the formation surface 518 and does not contain information about the shape of the free surface above the streamer 504. On the other hand, the source-ghost of the direct up-going reflected wave 522, the down-going reflected wave 524, and the source-ghost of the down-going reflected wave 526 each contain information about the shape of the formation surface 518 and contain information about the shape and properties of the free surface 508 at the time acoustic energy is reflected from the free surface 508. As a result, the reflected waves 522, 524, and 526 do not match the shape of the up-going reflected wave 520. For example, the difference between the shape of the source-ghost of the direct up-going reflected wave 522 and the shape of the direct up-going reflected wave 520 is the shape of the free surface 508 at the time acoustic energy is reflected from the free surface 508, as shown in the snapshot 515. Ideally, the up-going reflected waves are used to extract information, such as seismic images, about the composition of a subterranean formation. The receiver ghosts and source ghosts may be considered a form of noise that contaminates the pressure and vertical velocity data.

Methods described below extract statistical information about the free surface from N gathers of pressure and vertical velocity data (e.g., gathers of pressure and vertical velocity data) obtained for N activations of a source. Each gather of pressure data and gather of vertical velocity data contains direct up-going reflected waves, source-ghosts of direct up-going reflected waves, down-going reflected waves, and source-ghosts of down-going reflected waves for the formation surface and interfaces of a subterranean formation, as described above with reference to FIG. 5. Methods described below compute ghost operators from gathers of pressure and vertical velocity data recorded for N source activations. The ghost operators may be used to characterize the actual source and receiver ghosts recorded in the seismic data, compute properties of the free surface, such as a reflection coefficient and root mean square free surface height, and may be used to deghost pressure and vertical velocity data.

Figure 6A:
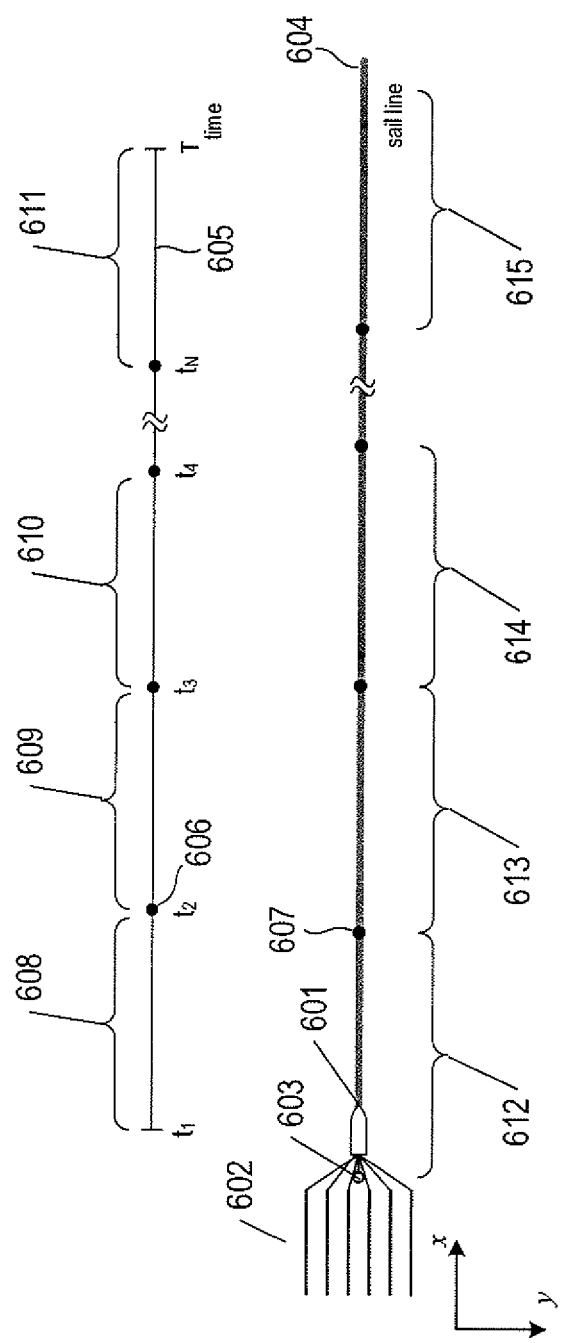
FIG. 6A shows an example of recording seismic data in separate shot records of a marine seismic survey.

FIG. 6A shows an example of recording seismic data in N separate shot records as a survey vessel travels a sail line of a marine seismic survey. In the example of FIG. 6A, a survey vessel 601 tows six streamers 602 and a source 603 along a sail line 604. FIG. 6A includes a time axis 605 with source-activation times denoted by $t_i$, where $i=1, 2, \ldots, N$, and represented by circles, such as circle 606. Time, T, represents a time when seismic-data recording along the sail line 604 stops. As the survey vessel 601 travels the sail line 604 at a substantially constant rate of speed, the source 603 is activated at the N source-activation locations identified by circles 607. The source-activation locations 607 correspond to the source-activation times 606. After each activation of the source 603, pressure data and vertical velocity data are recorded in one of the time intervals 608-611, which corresponds to spatial intervals 612-615, respectively. In the example of FIG. 6, the notation $^i p$ represents a gather of pressure data composed of pressure data $^i p(\vec{x}_r, t)$ generated by pressure sensors in the streamers 602, and the notation $^i v_z$ represents a gather of vertical velocity data composed of vertical velocity data $^i v_z(\vec{x}_r, t)$ generated by particle motion sensors in the streamers 602. The gather of pressure data $^i p$ and the gather of vertical velocity data $^i v_z$ are shot records recorded in the i-th time and spatial intervals that follow the i-th activation of the source 603 at source-activation time $t_i$. For example, $^1 p$ represents a gather of pressure data and $^1 v_z$ represents a gather of vertical velocity data recorded in the first time interval 608, and $^N p$ represents a gather of pressure data and $^N v_z$ represents a gather of vertical velocity data recorded in the N-th time interval 609. In the following description, the term "recording interval" refers to either a time interval or spatial interval in which pressure and vertical velocity data are recorded.

Figure 6B:
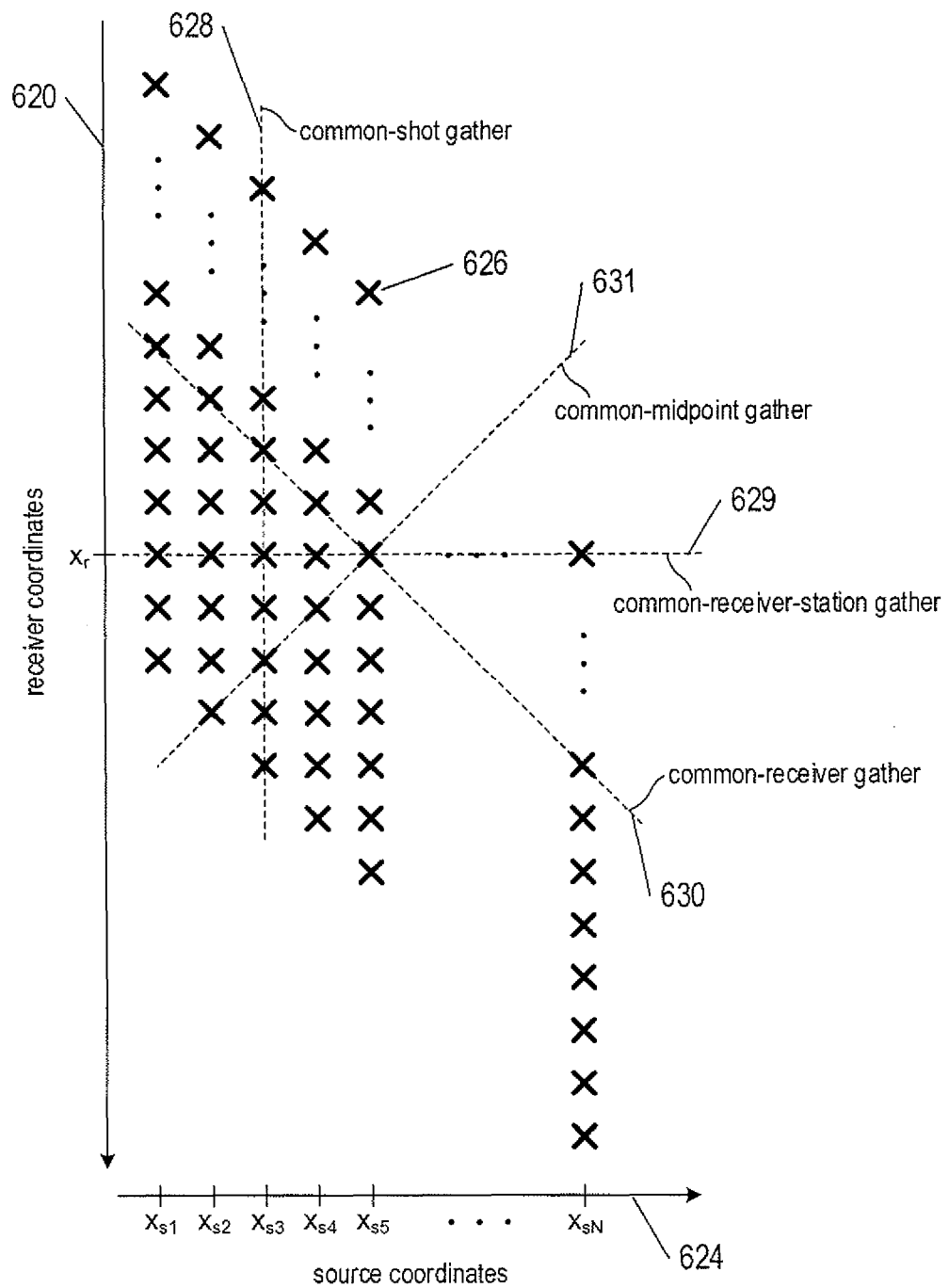
FIG. 6B shows a plot of different ways seismic data may be sorted into domains.

The pressure and vertical velocity data recorded in a time or spatial interval may be sorted into any one of many different domains, including the common-shot domain, common-receiver-station domain, common-midpoint domain, and common-receiver domain. FIG. 6B shows a plot of different ways seismic data may be sorted into different domains. Vertical axis 620 is an in-line receiver coordinate axis, and horizontal axis 624 is an in-line source coordinate axis. Each X, such as X 626, represents a receiver-coordinate location when the source is activated at a particular source-coordinate location. A dashed line 628 identifies the receiver-coordinate locations of receivers in the same streamer. A common-shot gather is formed from the seismic data generated by the receivers when the source is activated at source-coordinate location $x_{s3}$. A dashed line 629 identifies a receiver-coordinate location, x called a "common-receiver station," where different receivers are located when the source is activated at the N different source-coordinate locations. The seismic data generated by the receivers that are approximately located at the common-receiver station $x_r$ for each activation of the source are collected to form a common-receiver-station gather. Seismic data generated by receivers at the receiver-coordinate locations along diagonal dashed line 630 are collected to form a common-receiver gather. Seismic data generated by receivers at the receiver-coordinate locations along a diagonal represented by dashed line 631 are collected to form a common-midpoint ("CMP") gather. The CMP is the point on the formation surface halfway between the location of the source and the receiver and is the same for a number of source-receiver pairs. This redundancy of source-receiver pairs often increases the quality of stacked seismic data. The CMP is not to be confused with common depth points that are located directly below the CMP at interfaces within the subterranean formation.

FIGS. 7A-7B show an example gather of pressure data $^i p$ 701 and a corresponding example gather of vertical velocity data $^i v_z$ 702 sorted into the common-shot domain. Axes 703 and 704 represent spatial coordinates (i.e., traces or channels) of the same receivers located along a streamer, and axes 705 and 706 represent time. The gather of pressure data 701 and gather of vertical velocity data 702 are generated by collocated pressure and particle motion sensors in the same streamer. In the example of FIG. 7A, the notation $^i p$ represents the common-shot gather of pressure data 701. In the example of FIG. 7B, the notation $^i v_z$ represents the common-shot gather of vertical velocity data 702. Solid curves in the gather of pressure data 701, such as solid curves 707, represent direct up-going reflected waves, source-ghosts of direct up-going reflected waves, down-going reflected waves, and source-ghosts of down-going reflected waves from a formation surface and interfaces within a subterranean formation. Dashed curves in the gather of vertical velocity data 702, such as dashed curves 709, represent direct up-going reflected waves, source-ghosts of direct up-going reflected waves, down-going reflected waves, and source-ghost of down-going reflected waves from substantially the same formation surface and interfaces of the subterranean formation.

Methods to determine ghost operators may be applied to the full gathers of pressure and vertical velocity data, such as the gathers pressure and vertical velocity data 701 and 702. In alternative implementations, the methods may be applied to smaller portions of the pressure and vertical velocity data contained in time windows. The time windows may be positioned to encompass reflected waves with the highest signal-to-noise ratio. Typically reflected waves with the highest signal-to-noise ratio are associated with formation surface reflections.

Figures 8A, 8B:
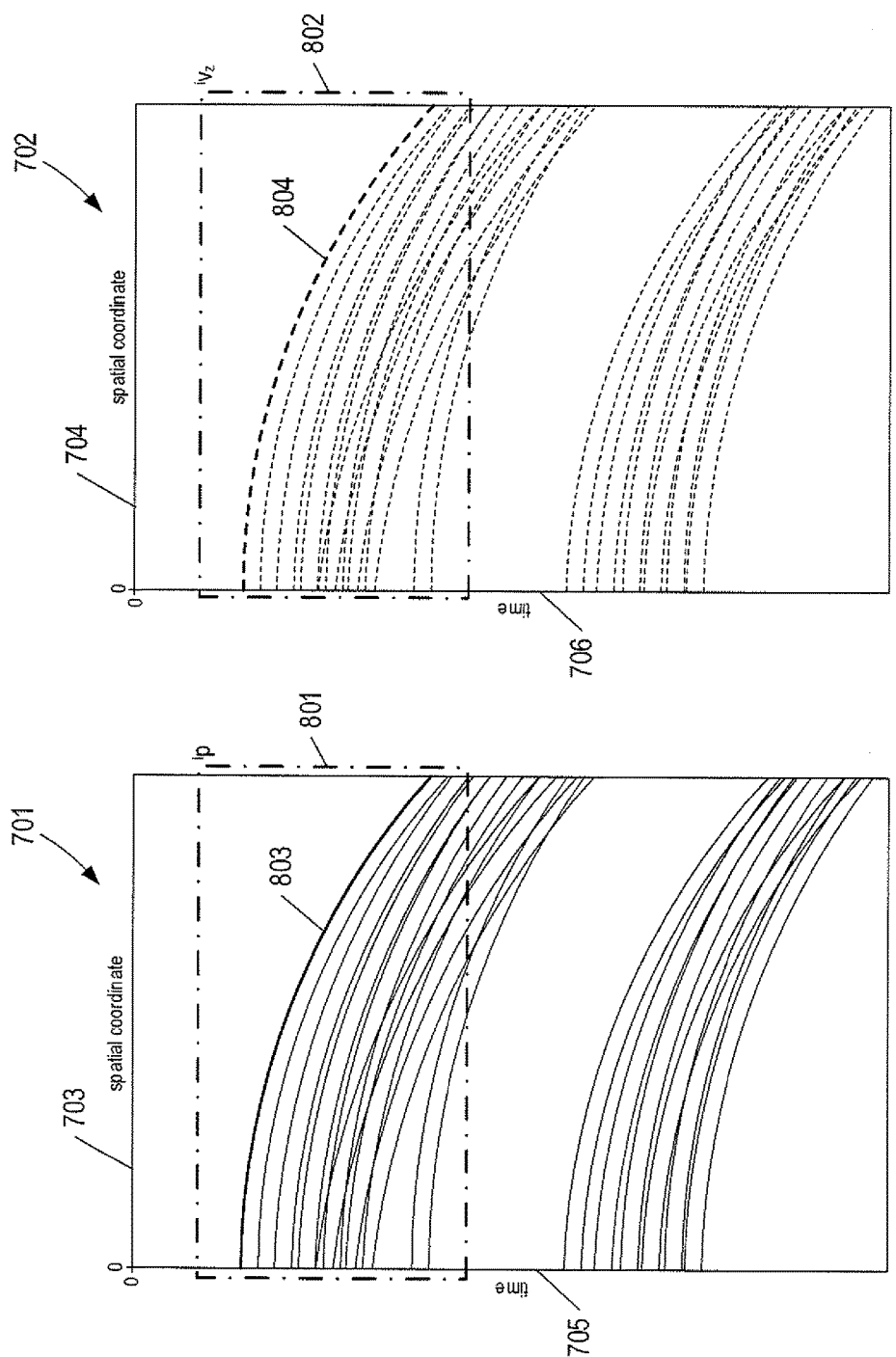
FIGS. 8A and 8B show examples of time windows in gathers of pressure and vertical velocity data.

FIG. 8A shows an example of a time windows 801 in the gather of pressure data 701, and FIG. 8B shows an example of a time window 802 in the gather of vertical velocity data 702. In the examples of FIGS. 8A and 8B, $^i p$ denotes the pressure data encompassed by the time window 801 and $^i v_z$ denotes the vertical velocity data encompassed by the time window 802. The time windows 801 and 802 are positioned to encompass formation-surface reflected waves represented by bolded solid curve 803 in time window 801 and represented by bolded dashed curve 804 in time window 802.

Figure 9:
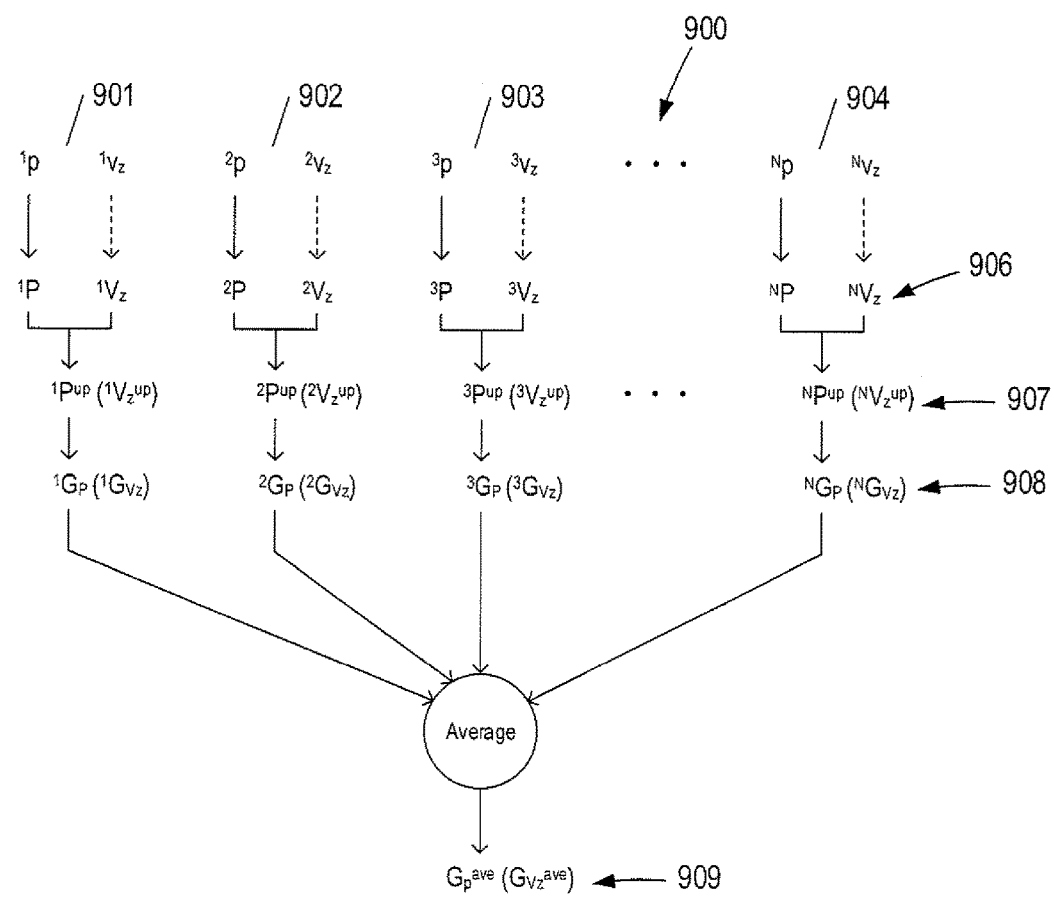
FIG. 9 shows a diagram of computing an average receiver-side ghost operator.

FIG. 9 shows a diagram 900 that represents computing average receiver-side pressure and vertical velocity ghost operators from the N gathers of pressure data $^i p$ and vertical velocity data $^i v_z$ described above with reference to FIG. 6. Columns 901-904 represent operations performed on the gathers of pressure and vertical velocity data generated in the N recording intervals to obtain N corresponding receiver-side pressure-ghost operators. At level 906, each gather of pressure data $^i p$ may be transformed from the space-time ("s-t") domain using a fast Fourier transform ("FFT"), or a discrete Fourier transform ("DFT"), to obtain a pressure spectrum, $^i P$, in the frequency-wavenumber ("f-k") domain. Each gather of vertical velocity data $^i v_z$ may also be transformed from the s-t domain using an FFT or a DFT to obtain a vertical velocity spectrum, $^i V_z$ in the f-k domain. In the f-k domain, the pressure spectrum $^i P$ may be represented as the sum of an up-going pressure spectrum and a down-going pressure spectrum:

$$^i P = {^i P^{up}} + {^i P^{down}} \qquad (2)$$

where
  $^i P^{up}$ is an up-going pressure spectrum; and
  $^i P^{down}$ is a down-going pressure spectrum.
The up-going pressure spectrum, $^i P^{up}$, is the combined spectra of direct up-going reflected waves and source-ghosts of direct up-going reflected waves. The down-going pressure spectrum, $^i P^{down}$, is the combined spectra of down-going reflected waves and source-ghosts of down-going reflected waves. In FIG. 9, at level 907 an up-going pressure spectrum $^i P^{up}$ is computed from the pressure spectrum $^i P$ and the vertical velocity spectrum $^i V_z$ for each of the N recording intervals:

$$^i P^{up} = \frac{1}{2}\left[ {^i P} - \frac{\rho \omega}{k_z} {^i V_z} \right] \qquad (3)$$

where
  $\omega$ is the angular frequency;
  $\rho$ is the density of water; and $$k_z = \sqrt{\left(\frac{\omega}{c}\right)^2 - k_x^2 - k_y^2}$$

is the z-direction or vertical wavenumber with c the speed of sound in water, $k_x$, is the x-direction or in-line wavenumber, and $k_y$ is the y-direction or cross-line wavenumber.
At level 909, a receiver-side pressure-ghost operator is computed by deconvolving the up-going pressure spectrum $^i P^{up}$ from the pressure spectrum $^i P$ for each of the N recording intervals:

$$^i G_P({^i P}, {^i V_z}) = \frac{^i P}{^i P^{up}} \qquad (4)$$

Deconvolving the up-going pressure spectrum $^i P^{up}$ from the pressure spectrum $^i P$ substantially removes information regarding the subterranean formation from the pressure spectrum $^i P$. As a result, the receiver-side pressure-ghost operator $^i G_P({^i P}, {^i V_z})$ characterizes propagation of the pressure wavefield from a streamer to the free surface, interaction with the free surface, and propagation back to the streamer. At level 909 the N receiver-side pressure-ghost operators of Equation (4) are averaged to obtain an average receiver-side pressure-ghost operator:

$$G_P^{ave}(P_N, V_{z,N}) = \frac{1}{N}\sum_{i=1}^{N} {}^iG_P({}^iP, {}^iV_z) \qquad (5)$$

where $P_N = \{{}^iP\}_{i=1}^{N}$ is a collection of N pressure spectra in the f-k domain; and $V_{z,N} = \{{}^iV_z\}_{i=1}^{N}$ is a collection of N vertical velocity spectra in the f-k domain.

In other words, the average receiver-side pressure-ghost operator is determined as a function of the N gathers of pressure and vertical velocity data.

FIG. 9 also shows computing an average receiver-side vertical velocity ghost operator based on gathers of up-going vertical velocity data. In the f-k domain, the gather of vertical-velocity data ${}^iV_z$ may also be represented as a sum of up-going and down-going vertical velocities spectra:

$${}^iV_z = {}^iV_z^{up} + {}^iV_z^{down} \qquad (6)$$

where ${}^iV_z^{up}$ is a up-going vertical velocity spectrum; and ${}^iV_z^{down}$ is a down-going vertical velocity spectrum.

The up-going vertical velocity spectrum, ${}^iV_z^{up}$, is the combined spectra of direct up-going reflected waves and source-ghosts of direct up-going reflected waves. The down-going vertical velocity spectrum, ${}^iV_z^{down}$, is the combined spectra of down-going reflected waves and source-ghosts of down-going reflected waves. At level 907 a up-going vertical velocity spectrum $iV_z^{up}$ is computed from the pressure spectrum ${}^iP$ and the vertical velocity spectrum $iV_z$ for each of the N recording intervals:

$${}^iV_z^{up} = \frac{1}{2}\left[{}^iV_z - \frac{k_z}{\rho\omega}{}^iP\right] \qquad (7)$$

At level 908, a receiver-side vertical velocity ghost operator is computed by deconvolving the up-going vertical velocity spectrum ${}^iV_z^{up}$ from the vertical velocity spectrum for each of the N recording intervals:

$${}^iG_{V_z}({}^iP, {}^iV_z) = \frac{{}^iV_z}{{}^iV_z^{up}} \qquad (8)$$

At level 909, the N receiver-side vertical velocity ghost operators are averaged to obtain an average receiver-side vertical velocity ghost operator:

$$G_{V_z}^{ave}(P_N, V_{z,N}) = \frac{1}{N}\sum_{i=1}^{N} {}^iG_{V_z}({}^iP, {}^iV_z) \qquad (9)$$

Figure 10:
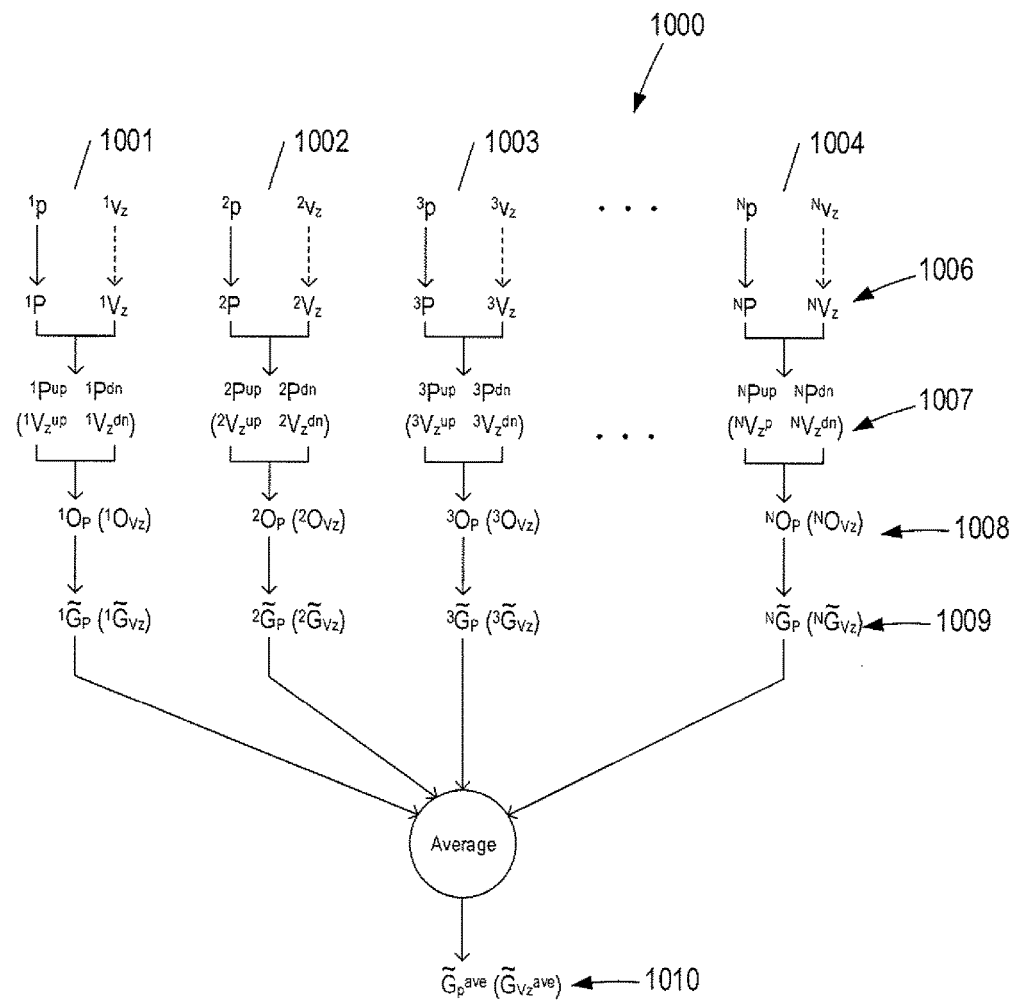
FIG. 10 shows a diagram of computing an average receiver-side ghost operator based on wavefield-propagation operators.

FIG. 10 shows a diagram 1000 that represents computing average receiver-side pressure and vertical velocity ghost operators from the N gathers of pressure data ${}^ip$ and vertical velocity data ${}^iv_z$ described above with reference to FIG. 6. Columns 1001-1004 represent operations performed on the gathers of pressure and vertical velocity data generated in the N recording intervals 608-611 to obtain N corresponding receiver-side pressure-ghost operators. At level 1006 the gathers of pressure data and vertical velocity data are transformed from the s-t domain to the f-k domain. At level 1007, for each of the N recording intervals, an up-going pressure spectrum ${}^iP^{up}$ is computed according to Equation (3) and a down-going pressure spectrum ${}^iP^{down}$ is computed from the pressure spectrum ${}^iP$ and the vertical velocity spectrum ${}^iV_z$:

$${}^iP^{down} = \frac{1}{2}\left[{}^iP + \frac{\rho\omega}{k_z}{}^iV_z\right] \qquad (10)$$

At level 1008, the up-going pressure spectrum is deconvolved from the down-going pressure spectrum in order to obtain wavefield-propagation operators for each of the N recording intervals:

$${}^iO_P({}^iP, {}^iV_z) = \frac{{}^iP^{down}}{{}^iP^{up}} \qquad (11)$$

The pressure wavefield-propagation operator ${}^iO_P({}^iP,{}^iV_z)$ characterizes propagation of the wavefield from a streamer to the free surface, interaction with the free surface, and propagation back to the streamer. At level 1009, receiver-side pressure-ghost operators are computed for each of the N recording intervals:

$${}^i\tilde{G}_P({}^iP,{}^iV_z) = 1 + {}^iO_P({}^iP,{}^iV_z) \qquad (12)$$

At level 1010, the N receiver-side pressure-ghost operators ${}^i\tilde{G}_P({}^iP,{}^iV_z)$ are averaged to obtain an average receiver-side pressure-ghost operator:

$$\tilde{G}_P^{ave}(P_N, V_{z,N}) = \frac{1}{N}\sum_{i=1}^{N} {}^i\tilde{G}_P({}^iP, {}^iV_z) \qquad (13)$$

FIG. 10 also shows computing an average receiver-side vertical velocity ghost operator based on gathers of up-going vertical velocity data. At level 1007, for each of the N recording intervals, an up-going vertical velocity spectrum ${}^iV_z^{up}$ is computed according to Equation (7) and a down-going vertical velocity spectrum ${}^iV_z^{down}$ is computed from the pressure spectrum ${}^iP$ and the vertical velocity spectrum ${}^iV_z$:

$${}^iV_z^{down} = \frac{1}{2}\left[{}^iV_z + \frac{k_z}{\rho\omega}{}^iP\right] \qquad (14)$$

At level 1008, the up-going vertical velocity spectrum is deconvolved with the down-going vertical velocity spectrum in order to obtain a vertical velocity wavefield-propagation operator for each of the N recording intervals:

$${}^iO_{V_z}({}^iP, {}^iV_z) = \frac{{}^iV_z^{down}}{{}^iV_z^{up}} \qquad (15)$$

The wavefield-propagation operator ${}^iO_{V_z}({}^iP,{}^iV_z)$ characterizes propagation of the wavefield from a streamer to the free surface, interaction with the free surface, and propagation back to the streamer. At level 1009, receiver-side vertical velocity ghost operators are computed for each of the N recording intervals:

$${}^i\tilde{G}_{V_z}({}^iP,{}^iV_z) = 1 - {}^iO_{V_z}({}^iP,{}^iV_z) \qquad (16)$$

At level 1010, the N receiver-side vertical velocity ghost operators ${}^i\tilde{G}_{V_z}({}^iP,{}^iV_z)$ are averaged to obtain an average receiver-side vertical velocity ghost operator:

$$\tilde{G}_{V_z}^{ave}(P_N, V_{z,N}) = \frac{1}{N}\sum_{i=1}^{N} {}^i\tilde{G}_{V_z}({}^iP, {}^iV_z) \quad (17)$$

Any one of the average receiver-side pressure and vertical velocity ghost operators $G_P^{ave}(P_N,V_{z,N})$, $G_{V_z}^{ave}(P_N,V_{z,N})$, $\tilde{G}_P^{ave}(P_N,V_{z,N})$, and $\tilde{G}_{V_z}^{ave}(P_N,V_{z,N})$ may be used to compute properties of the free surface, such as the free-surface reflection coefficient and root mean square ("RMS") height of the free surface. The reflection coefficient of the free surface may be related to an average receiver-side ghost operator in the f-k domain as follows:

$$R(k_z,\bar{z}_r,P_N,V_{z,N}) = (G_X^{ave}(P_N,V_{z,N})-1)\exp(-i2k_z\bar{z}_r) \quad (18)$$

where
 i is the complex unit $\sqrt{-1}$;
 $\bar{z}_r$ is the average receiver depth;
 $k_z = \omega/c \cos\theta$;
 $\theta$ is the incidence angle measured with respect to the normal or vertical direction to the free surface; and
 $G_X^{ave}(P_N,V_{z,N})$ may be any one of the average receiver-side pressure and vertical velocity ghost operators $G_P^{ave}(P_N,V_{z,N})$, $G_{V_z}^{ave}(P_N,V_{z,N})$, $\tilde{G}_P^{ave}(P_N,V_{z,N})$, and $\tilde{G}_{V_z}^{ave}(P_N,V_{z,N})$.

The reflection coefficient computed according to Equation (18) is a function of the vertical wavenumber $k_z$, the average receiver depth $\bar{z}_r$, and the collections of pressure and vertical velocity data $P_N$ and $V_{z,N}$.

The reflection coefficient of Equation (18) may be related to the RMS height of the free surface as follows:

$$R(k_z, \bar{z}_r, P_N, V_{z,N}) = -\exp(-2(\sigma k_z)^2) = -\exp\left(-2\left(\frac{\sigma\omega}{c}\right)^2\right) \quad (19)$$

where
 $\sigma$ is the RMS height of the free surface; and
 incidence angle $\theta$ is equal to zero in $k_z$ (i.e., vertical incidence).

From Equation (19), the RMS height of the free surface may be approximated by:

$$\sigma(k_z, \bar{z}_r, P_N, V_{z,N}) \approx \frac{c}{\omega}\sqrt{\frac{R(k_z, \bar{z}_r, P_N, V_{z,N})+1}{2}} \quad (20)$$

Figure 11:
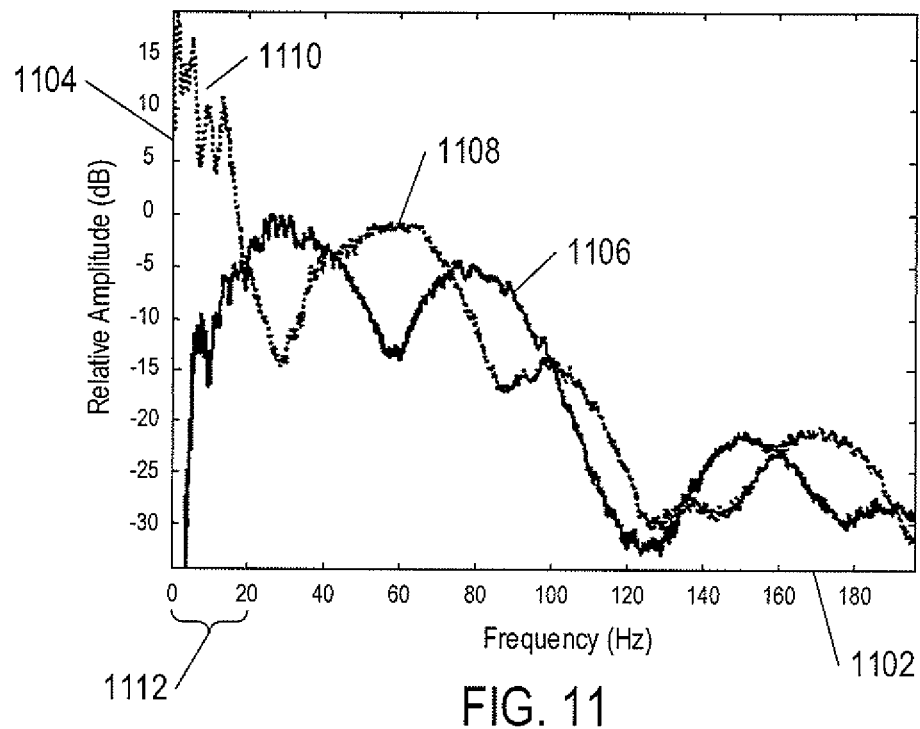
FIG. 11 shows examples of frequency spectra for pressure and vertical-velocity data.

Vertical velocity data is often contaminated with vibrational noise over a low-frequency range. FIG. 11 shows examples of pressure and vertical-velocity spectra. Horizontal axis 1102 represents a frequency domain, vertical axis 1104 represents relative amplitude, solid curve 1106 represents the pressure spectrum, and dotted curve 1108 represents the vertical velocity spectrum. A large relative amplitude 1110 in the vertical velocity spectrum 1108 over a low-frequency range 1112 results from low-frequency noise typically created by streamer vibrations, which, in this example, ranges from 0 to about 20 Hz. The pressure spectrum 1106 and the vertical velocity spectrum 1108 above the low-frequency range 1112 exhibit satisfactory signal-to-noise ratios (i.e., relative amplitude less than zero).

The reflection coefficient of Equation (18) may be used to compute an approximate vertical velocity spectrum to replace the vertical velocity spectrum over the low-frequency range 1112:

$$V_z^{app} = P\frac{k_z}{\rho\omega}\frac{1-R(k_z,\bar{z}_r,P_N,V_{z,N})\exp(-i2\pi k_z\bar{z}_r)}{1+R(k_z,\bar{z}_r,P_N,V_{z,N})\exp(-i2\pi k_z\bar{z}_r)} \quad (21)$$

The approximate vertical-velocity spectrum may replace the vertical-velocity spectrum over the low-frequency range 1112 provided the pressure spectrum of the pressure data has a satisfactory signal-to-noise ratio over the low-frequency range, the pressure spectrum has no notches over the low-frequency range, and the depth of the pressure sensors are known. The low-frequency part of the vertical velocity spectrum may be replaced by the approximate vertical-velocity spectrum by computing a combined vertical velocity spectrum:

$$V_z^{combined} = \begin{cases} V_z^{app} & \omega \leq \omega_n \\ W_L(\omega)V_z^{app} + W_H(\omega)V_z & \omega_n < \omega \leq \omega_c \\ V_z & \omega_c < \omega \end{cases} \quad (22)$$

where
 $\omega_n$ is an upper limit on the low-frequency range;
 $\omega_c$ is a cutoff frequency; and
 $W_L(\omega)$ is a low-pass filter and $W_H(\omega)$ is a high-pass filters given by $$W_L(\omega) = \frac{\omega_c - \omega}{\omega_c - \omega_n} \quad (23)$$

$$W_H(\omega) = \frac{\omega - \omega_n}{\omega_c - \omega_n} \quad (24)$$

The combined vertical velocity spectrum $V_z^{combined}$ may be transformed from the f-k domain to the s-t domain to obtain combined vertical velocity data, $v_z^{combined}$, that is substantially free of the low-frequency noise. In alternative implementations, other filters may be used in place of the linear low-pass and high-pass filters, such as a Hanning cosine-shaped filter.

The average receiver-side pressure and vertical velocity ghost operators may be used to cross-ghost pressure and vertical velocity data. Cross-ghosting normalizes the amplitudes of the corresponding gathers of pressure data ${}^ip$ and vertical velocity data ${}^iv_z$. The gather of pressure data ${}^ip$ is transformed from the s-t domain to the f-k domain. A cross-ghosted pressure spectrum may be calculated in the f-k domain as follows:

$${}^iP^{xg} = \frac{k_zc}{\omega}G_{V_z}^{ave}(P_N, V_{z,N}){}^iP \quad (25)$$

The gather of vertical velocity data ${}^iv_z$ is transformed from the s-t domain to the f-k domain. A cross-ghosted vertical velocity spectrum may be calculated in the f-k domain as follows:

$${}^iV_z^{xp} = G_P^{ave}(P_N, V_{z,N}){}^iV_z \quad (26)$$

The cross-ghosted pressure and vertical velocity spectra, ${}^iP^{xg}$ and ${}^iV_z^{xp}$, may be transformed from the f-k domain to the s-t domain using an inverse FFT or an inverse DFT to obtain gathers of cross-ghosted pressure and vertical velocity data, ${}^ip^{xg}$ and ${}^iv_z^{xp}$, respectively. The gathers of cross-ghosted pressure and vertical velocity data ${}^ip^{xg}$ and ${}^iv_z^{xp}$ have substantially equalized amplitudes.

Figure 12:
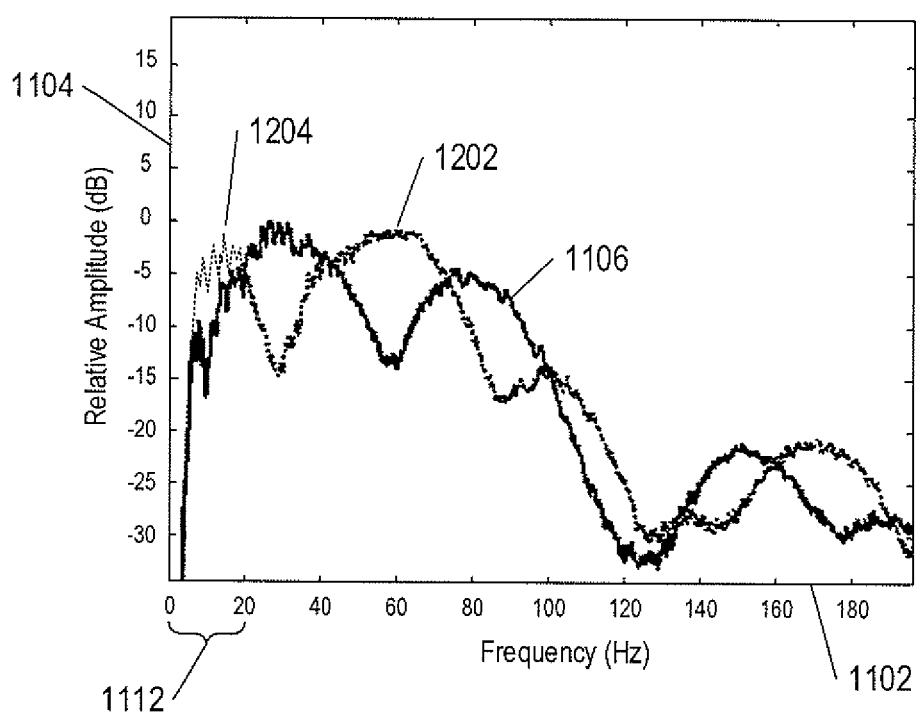
FIG. 12 shows the pressure spectrum and an example of a combined vertical velocity spectrum.

FIG. 12 shows a plot of the pressure spectrum 1106 and an example combined vertical velocity spectrum 1202. The combined vertical velocity spectrum 1202 represents Equation (22), which is composed the vertical velocity spectrum 1108 of FIG. 11 for frequencies greater than about 20 Hz and an approximate vertical velocity spectrum 1204 over the low-frequency range 1112.

Methods include computing an average source-side pressure and vertical velocity ghost operator that may be used to compute substantially ghost-free pressure and vertical velocity data. The average source-side pressure and vertical velocity ghost operators are calculated from common-receiver-station gathers of pressure and vertical velocity data and estimated ghost-free source signatures as follows.

Figure 13:
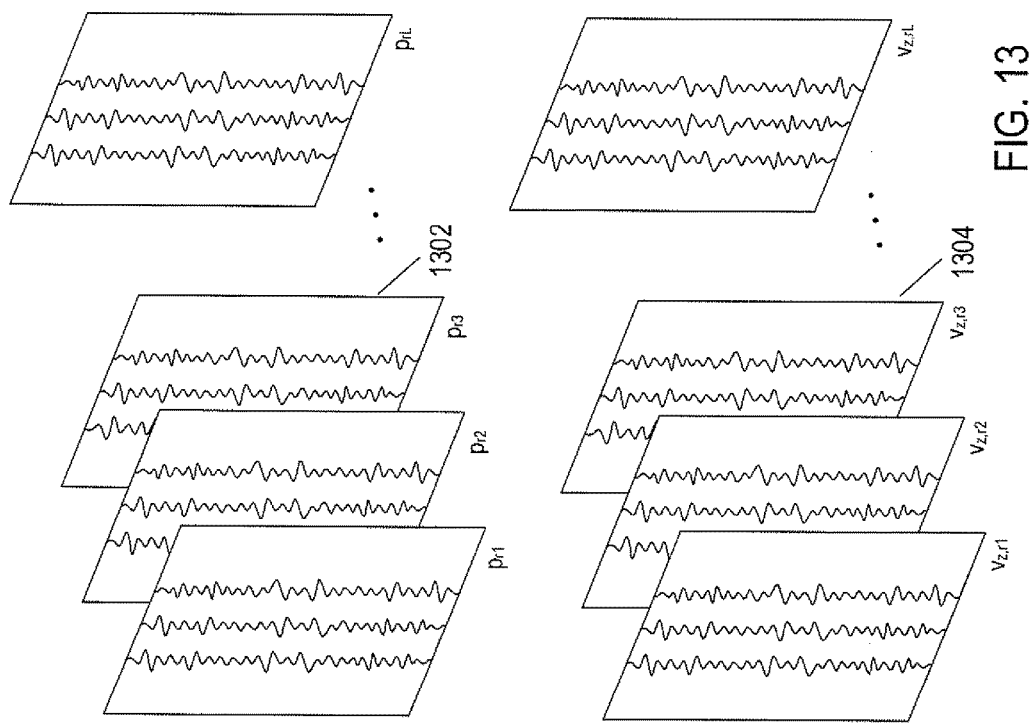
FIG. 13 shows common-receiver-station gathers of pressure data and vertical velocity data.

FIG. 13 shows L common-receiver-station gathers of pressure data denoted by $p_{r,l}$ and L corresponding common-receiver-station gathers of vertical velocity data denoted by $v_{z,r,l}$, where l is a common-receiver-station gather index l= 1, . . . , L. For example, common-receiver-station gather $p_{r,3}$ 1302 represents a collection of traces generated by a number of pressure sensors located at approximately the same common-receiver station for N activations of the source, and common-receiver-station gather $v_{z,r,3}$ 1304 represents a collection of traces generated by particle motion sensors at the same common-receiver station for the same N activations of the source. Each trace of a common-receiver-station gather depends on a different angle of reflection. The angle of reflection associated with each trace in a common-receiver-station gather may be calculated by assuming a horizontally layered subterranean formation.

Figure 14A:
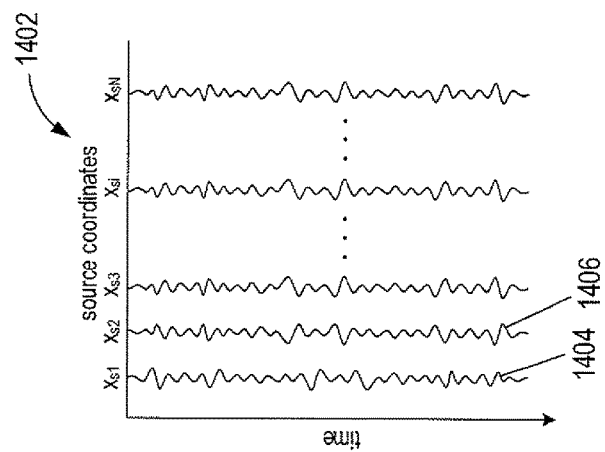
FIGS. 14A-14C show an example calculation of angles of reflection for each trace of an example common-receiver-station gather.
Figure 14B:
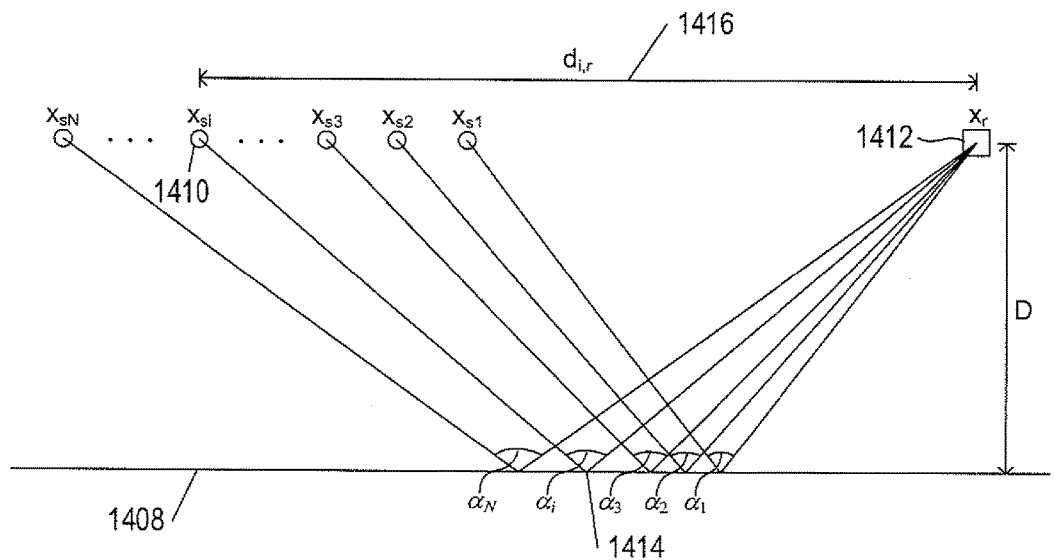
Figure 14C:
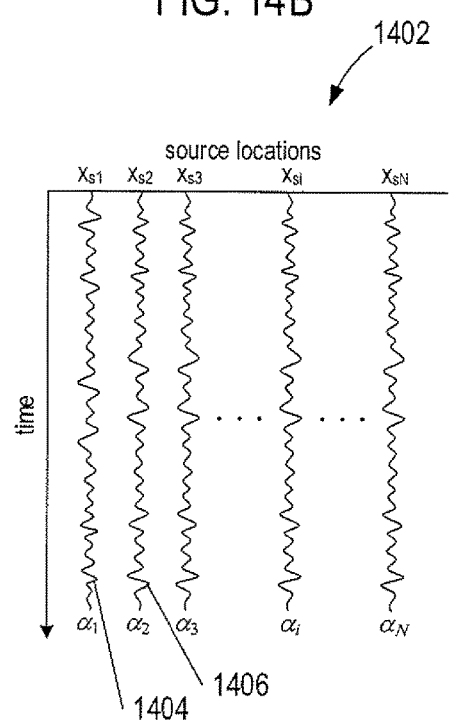

FIGS. 14A-14C show an example calculation of angles of reflection for each trace of an example common-receiver-station gather 1402. FIG. 14A shows the common-receiver-station gather 1402 composed of N traces. The traces may be generated by N different pressure sensors, or particle motion sensors, for N separate source activations, as represented by dashed line 629 in FIG. 6B. For example, trace 1404 may represent pressure data generated by a pressure sensor located at a common-receiver station when the source is activated at source coordinate location $x_{s1}$, and trace 1406 may represent pressure data generated by a different pressure sensor at approximately the same common-receiver station when the source is activated at source coordinate location $x_{s2}$.

FIG. 14B shows an example of a flat horizontal formation surface 1408 of a subterranean formation used to calculate the angle dependence for each trace in the common-receiver-station gather 1402. A series of circles, such as circle 1410, represent the N coordinate locations of the source, and square 1412 represents a common-receiver station. The angle associated with each trace is calculated from the source-receiver offset and the depth D of the formation surface 1408 below the common-receiver station 1412. The angle associate with each trace in the common-receiver-station gather represents the angle of reflection at a point on the formation surface 1408 below a midpoint of the source-receiver offset. For example, point 1414 on the formation surface 1408 represent a point of reflection from the formation surface 1408 below a midpoint of the source-receiver offset 1416, $d_{i,r}$, between the source activation coordinate location $x_{si}$ and the common-receiver station $x_r$ 1412. The angle of reflection is calculated by $$\alpha_i = 2\tan^{-1}\left(\frac{d_{i,r}}{D}\right) \quad (27)$$

FIG. 14C shows the common-receiver-station gather 1402 and the corresponding angles of reflection represented in FIG. 14B for each trace. For example, the angle of reflection $\alpha_1$ in FIG. 14B corresponds to the trace 1404 and the angle of reflection $\alpha_2$ corresponds to the trace 1406.

In other implementations, $\tau$–p transformation may be used to calculate the angles of reflection. In still other implementations, a local velocity profile derived from semblance velocity picking at midpoint locations between source and receiver locations may be used to calculate the angle of reflection. The angle of reflection may be calculated from the velocity profile and the source-receiver offset.

Figure 15:
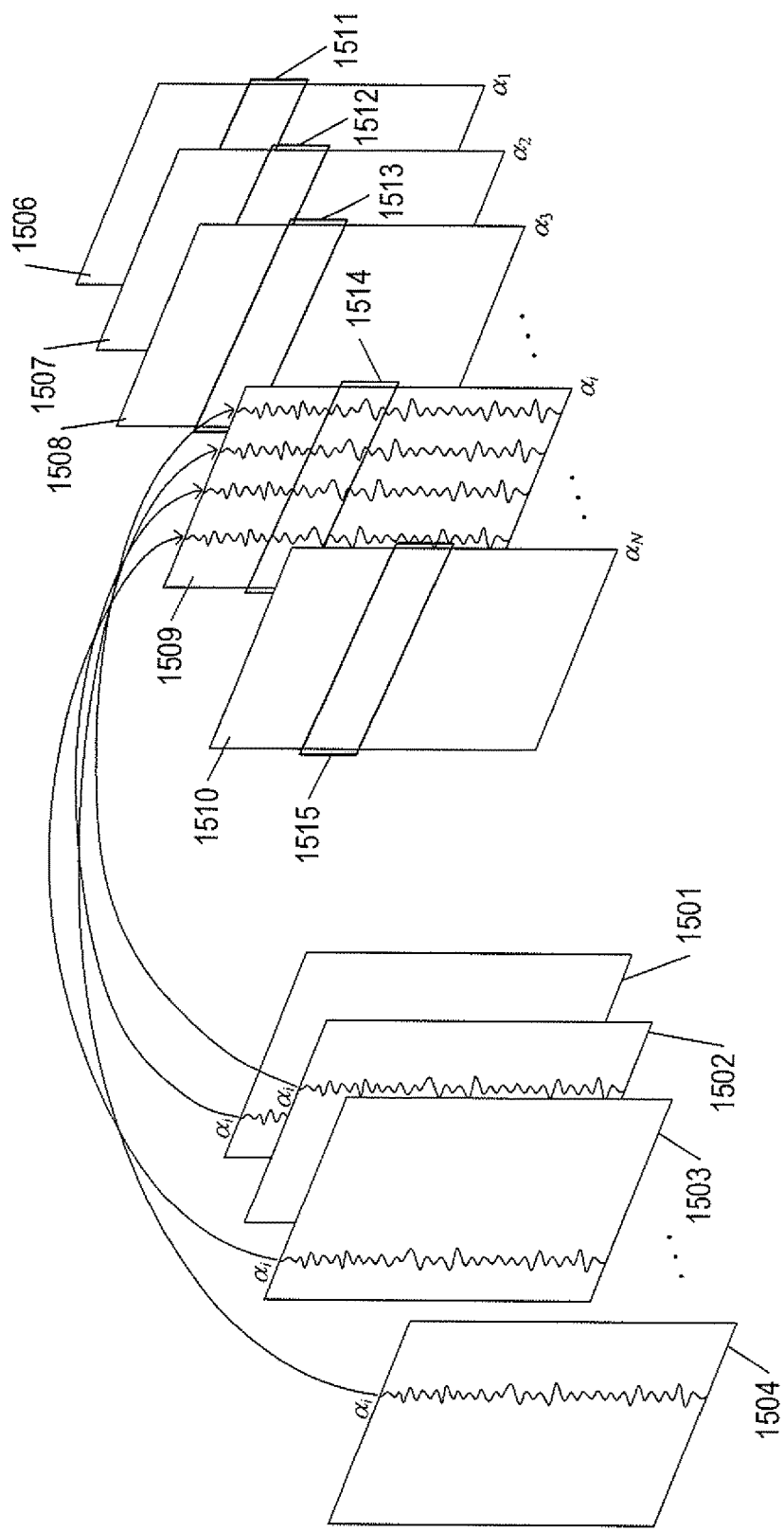
FIG. 15 shows an example of collecting traces with approximately the same corresponding angle of reflection to form common-angle gathers.

Traces of common-receiver-station gathers with approximately the same angle of reflection are collected to form common-angle gathers. FIG. 15 shows an example of collecting traces with approximately the same corresponding angle to form N common-angle gathers. In the example of FIG. 15, common-receiver-station gathers 1501-1504 represent M common-receiver-station gathers of pressure data or vertical velocity data. Traces with the same angle of reflection are collected to form N common-angle gathers 1506-1510. For example, traces with the same angle of reflection $\alpha_i$ are represented in each of the common-receiver-station gathers 1501-1504 and are collected to form the common-angle gather 1509. Windows are used to enclose the same reflection event and associated ghosts in each of the common-angle gathers 1506-1510. For example, in FIG. 15, rectangles 1511-1515 enclose portions the common-angle gathers 1506-1510 that correspond to the same reflections event, such as a formation surface reflection event, and the associated ghost reflections.

Traces within each of the windows are aligned in time. The time alignment within each window may be performed by identifying one of the traces as a reference trace, identifying the first maximum absolute amplitude in each trace, and time shifting the traces so that the times of the first maximum absolute amplitude of the traces correspond to the time of the first maximum absolute amplitude of the reference trace.

Figure 16:
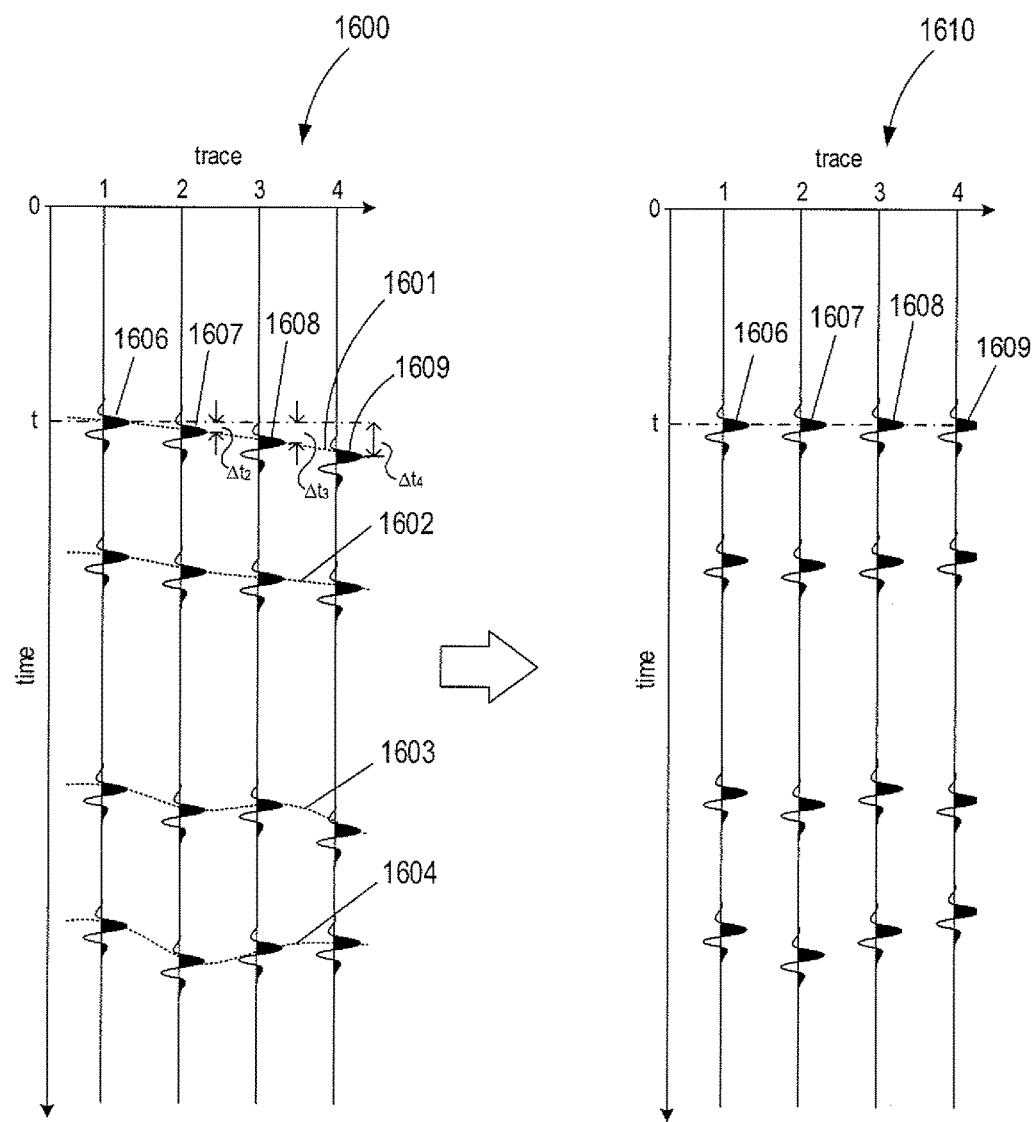
FIG. 16 shows an example of time aligning four traces enclosed by a window.

FIG. 16 shows an example of time aligning four traces enclosed by a window 1600. The window 1600 encloses an up-going reflected wave 1601, a source-ghost of the up-going reflected wave 1602, a down-going reflected wave 1603, and a source-ghost of the down-going reflected wave 1604. Trace 1 is identified as a reference trace and wavelet 1606 is the first maximum absolute amplitude that occurs at the earliest time t in the window 1600. The wavelets 1607-1609 occur at times $\Delta t_2$, $\Delta t_3$, and $\Delta t_4$ after the wavelet 1606. The traces 2, 3, and 4 are aligned with the trace 1 by time shifting the traces 2, 3, and 4 within the time window by the times $\Delta t_2$, $\Delta t_3$, and $\Delta t_4$, respectively, to obtain time-aligned traces in a window 1610. The traces 2, 3, and 4 have been time shifted so that the wavelets 1607-1609 are aligned in time with the time of the wavelet 1606 of the reference trace 1.

Figure 17:
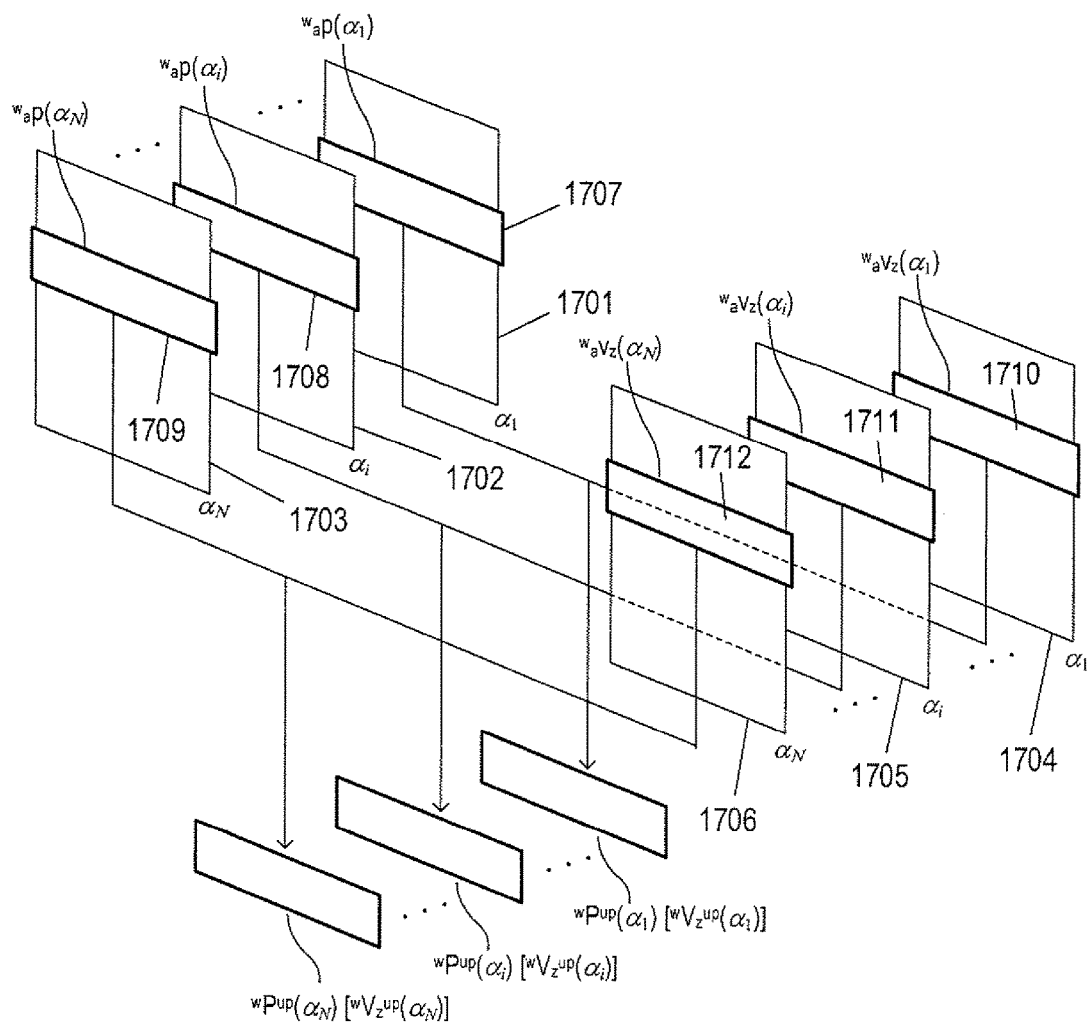
FIG. 17 shows calculation of up-going pressure data, or up-going vertical velocity data, in windows that correspond to the same angle of reflection.

Up-going pressure data or up-going vertical velocity data are calculated from the time-aligned pressure data and time-aligned vertical velocity data in windows that correspond to the same angle of reflection. FIG. 17 shows calculation of up-going pressure data, or up-going vertical velocity data, in windows that correspond to the same angle of reflection. Rectangles 1701-1703 represent common-angle gathers of pressure data for corresponding angles of reflection $\alpha_1$, $\alpha_i$, and $\alpha_N$, and rectangles 1704-1706 represent common-angle gathers of vertical velocity data for the same corresponding angles of reflection $\alpha_1$, $\alpha_i$, and $\alpha_N$. Rectangles 1707-1709 represent windows of time-aligned pressure data denoted by $_a{}^w p(\alpha_1)$, $_a{}^w p(\alpha_i)$, and $_a{}^w p(\alpha_N)$, and rectangles 1710-1712 represent windows of time-aligned vertical velocity data denoted by $_a^w v_z(\alpha_1)$, $_a^w v_z(\alpha_i)$, and $_a^w v_z(\alpha_N)$, where the subscript "a" represents time aligned and the superscript "w" represents window. As shown in FIG. 17, from each of the N pairs of time-aligned pressure data, $_a^w p(\alpha_i)$, and time-aligned vertical velocity data, $_a^w v_z(\alpha_i)$, that correspond to the same angle of reflection, a time-aligned up-going pressure spectrum is calculated as follows:

$$_a^w P^{up}(\alpha_i) = \frac{1}{2}\left[_a^w P(\alpha_i) - \frac{\rho\omega}{k_z}{}_a^w V_z(\alpha_i)\right] \quad (28)$$

where
$_a^w P(\alpha_i)$ is the time-aligned up-going pressure spectrum of the time-aligned pressure data $_a^w p(\alpha_i)$ as a result of transformation to the f-k domain; and
$_a^w V_z(\alpha_i)$ is the time-aligned up-going vertical velocity spectrum of the time-aligned vertical velocity data $_a^w v_z(\alpha_i)$ as a result of transformation to f-k domain.

Analogously, a time-aligned up-going vertical velocity spectrum may be calculated from each of the N pairs of time-aligned pressure data, $_a^w p(\alpha_i)$, and time-aligned vertical velocity data, $_a^w v_z(\alpha_i)$, as follows:

$$_a^w V_z^{up}(\alpha_i) = \frac{1}{2}\left[_a^w V_z(\alpha_i) - \frac{k_z}{\rho\omega}{}_a^w P(\alpha_i)\right] \quad (29)$$

In order to calculate an average source-side pressure and vertical velocity ghost operator, estimated ghost-free source signatures, $s^{gf}$, are calculated in the s-t domain. The estimated ghost-free source signatures are calculated from near-field signatures of the pressure output from each of the source elements of the source.

Figure 18:
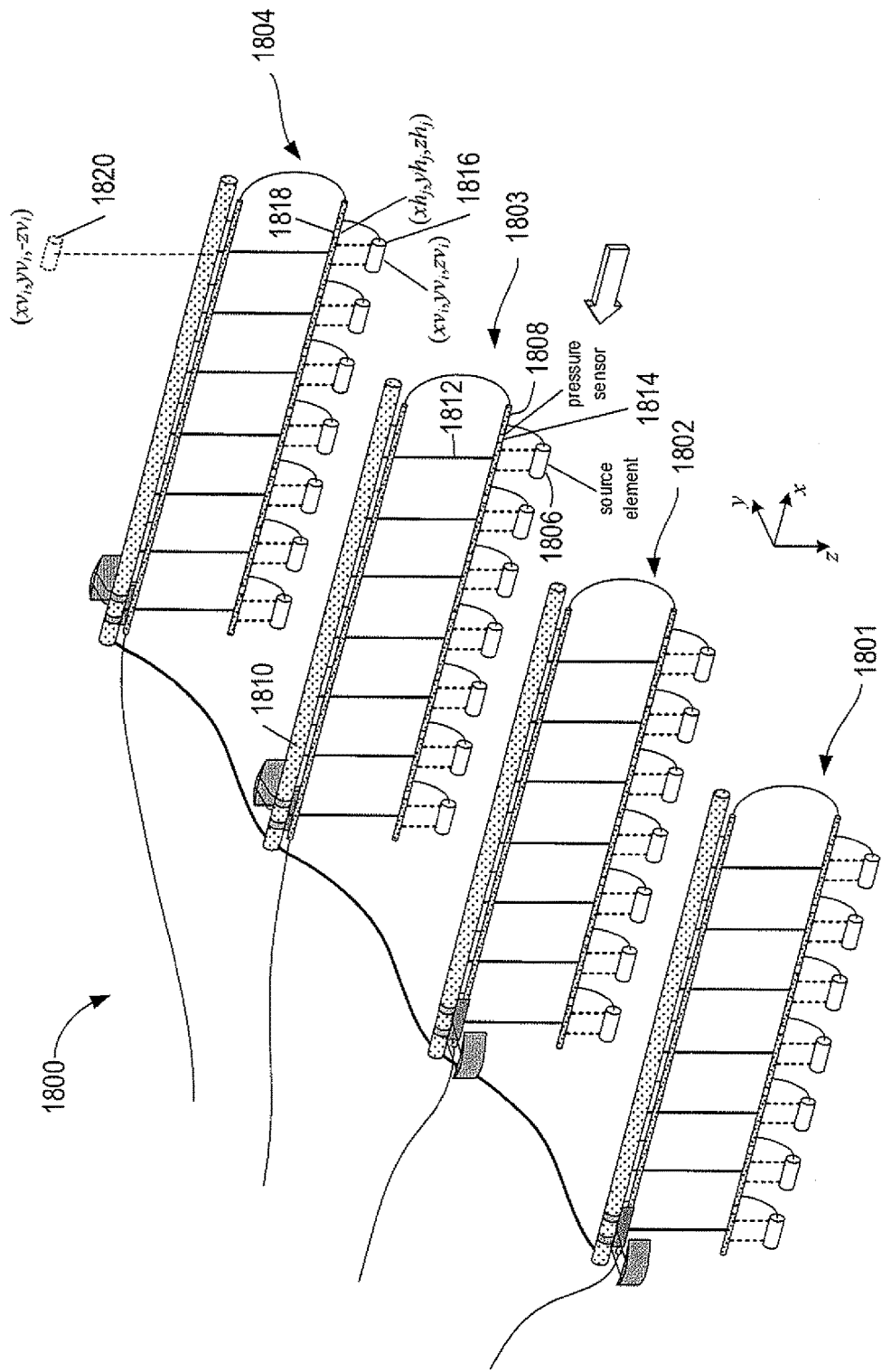
FIG. 18 shows an isometric view of an example source composed of four identically configured sub-array source elements.

FIG. 18 shows an isometric view of an example source 1800 composed of four identically configured sub-arrays 1801-1804. For example, the sub-array 1803 includes seven source elements, such as source element 1806, suspended from a semi-rigid rod 1808 that is suspended from a float 1810 by depth ropes 1812. The source elements may be air guns or water guns. The sub-array 1803 also includes seven pressure sensors, such as pressure sensor 1814, that are each located in close proximity to one of the source elements. For example, the pressure sensor 1814 is located in the near field (e.g., approximately 1 m to less than 10 m) of the source element 1806. Each source element, such as source element 1816, is assigned Cartesian coordinates ($xv_i,yv_i,zv_i$), where $xv_i$ and $yv_i$ represent the in-line and cross-line coordinates and $zv_i$ represents the depth of the source element below the free surface. Cartesian coordinates of the pressure sensors, such as pressure sensor 1818, are denoted by ($xh_j,yv_j,zh_j$), where $xh_j$ and $yh_j$ represent the in-line and cross-line coordinates and $zh_j$ represents the depth of the pressure sensor below the free surface. Each source element has an associated virtual source element. For example, the source element 1816 has an associated virtual source element 1820. Cartesian coordinates of the virtual source elements are denoted by ($xv_i,yv_i,-zv_i$), where $-zv_1$ represents the height of the virtual source element above the free surface.

Figure 19:
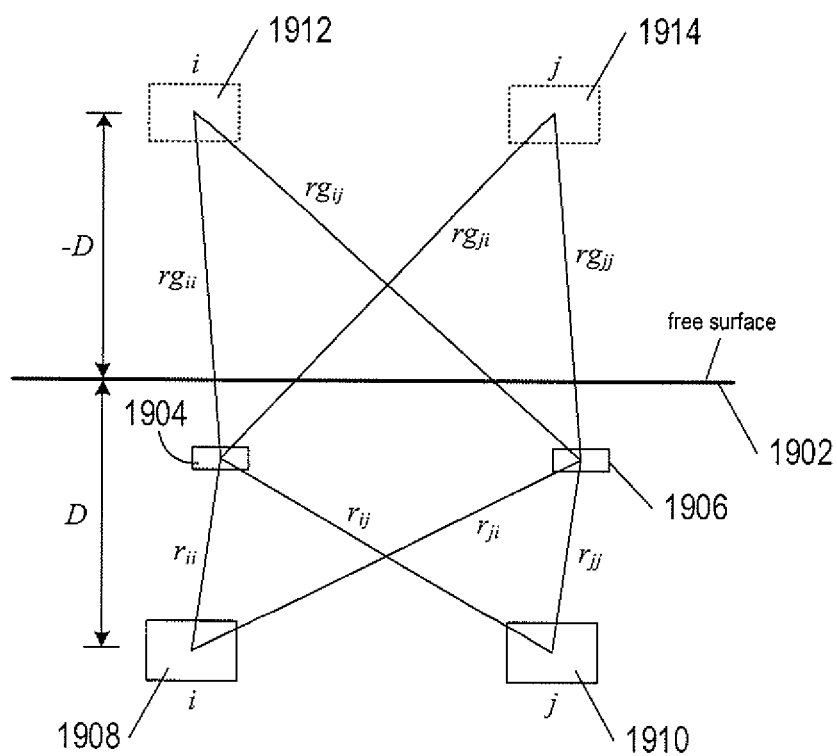
FIG. 19 shows distances between virtual source elements and pressure sensors and between source elements and the pressure sensors.

FIG. 19 shows distances between virtual source elements and pressure sensors and between source elements and the pressure sensors. Line 1902 represent a free surface of a body of water, and blocks 1904 and 1906 represent pressure sensors located beneath the free surface. Blocks 1908 and 1910 represent two source elements. Dashed line blocks 1912 and 1914 represent the virtual counterparts of the source elements 1908 and 1910. The source elements 1908 and 1910 are located a depth D below the free surface 1902, and the virtual source elements 1912 and 1914 are located a distance −D above the free surface 1902. Lines connecting the blocks represent distances where i is a source element and corresponding virtual source element index and j is a pressure sensor index. Distances between the source elements 1908 and 1910 and the pressure sensors 1904 and 1906 are given by:

$$r_{ij} = \sqrt{(xv_i - xh_j)^2 + (yv_i - yh_j)^2 + (zv_i - zh_j)^2} \quad (30)$$

Distance between the virtual source elements 1912 and 1914 and the pressure sensors 1904 and 1906 are given by:

$$rg_{ij} = \sqrt{(xv_i - xh_j)^2 + (yv_i - yh_j)^2 + (zv_i + zh_j)^2} \quad (31)$$

Note that although time dependence is not represented in Equations (30) and (31), the distances are actually time dependent.

Each of the pressure sensors measures a near-field signature denoted by $p_j^{nfs}(t)$, where $j=1, \ldots, M$ and M is the number of source elements. The near-field signature output by the jth pressure sensor of a source may be represented as the superposition of notional signatures of the source elements as follows:

$$p_j^{nfs}(t) = \sum_{i=1}^{M} \frac{1}{r_{ij}} p'_i\left(t - \frac{r_{ij}}{c}\right) + R'\sum_{i=1}^{M} \frac{1}{rg_{ij}} p'_i\left(t - \frac{rg_{ij}}{c}\right) \quad (32)$$

where
$p'_i$ is the notional signature of the ith source element; and
R' is the free-surface reflection coefficient.

When the source consists of M pressure sensors and M source elements, there are M independent equations in the form of Equation (32). The M independent equations form a system of M equations with M unknown notional signatures $p'_i$. Each notional signature $p'_i$ has units of pressure times distance. The M independent equations may be solved numerically for the M unknown notional signatures $p'_i$.

Figure 20:
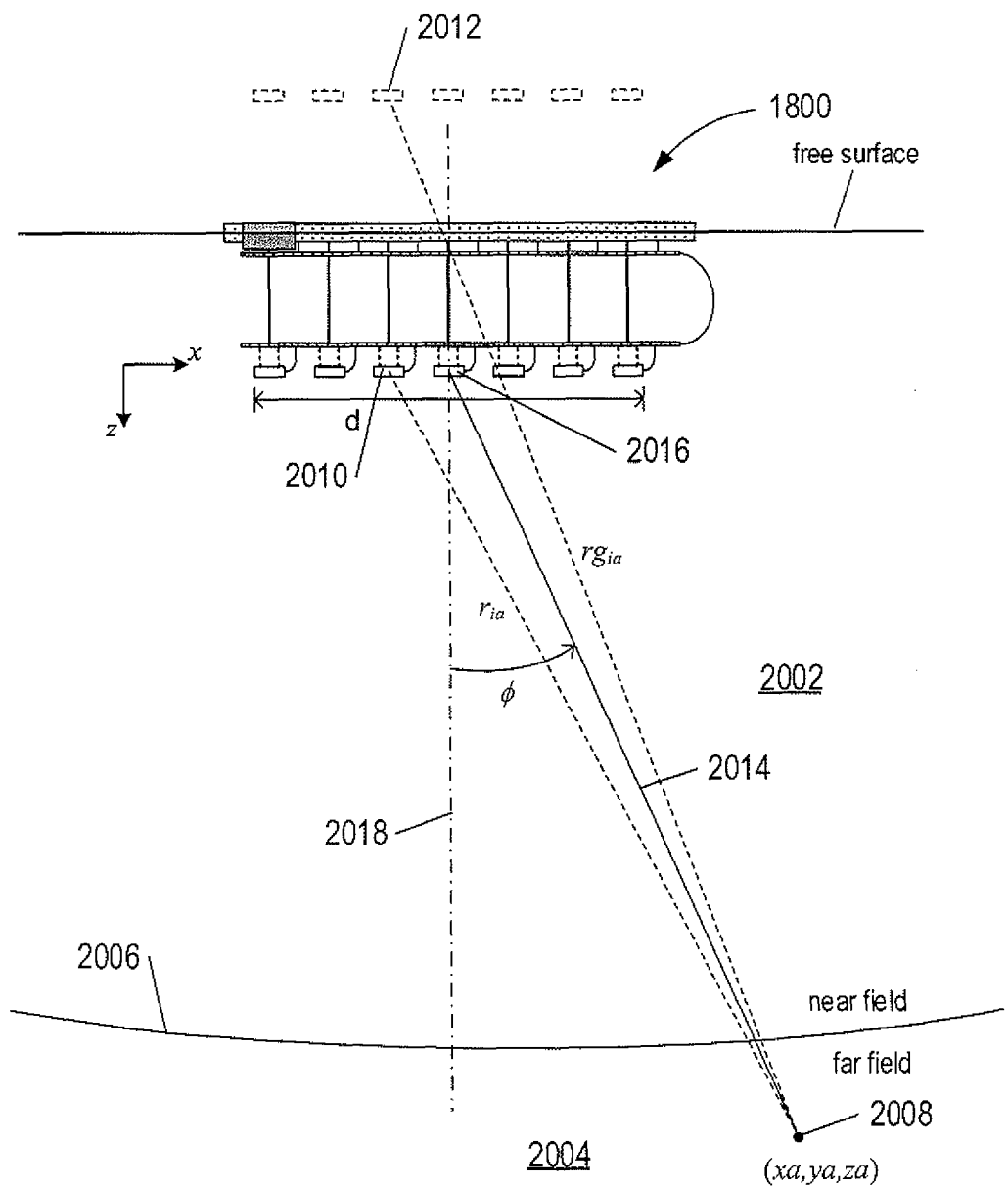
FIG. 20 shows an example of near field regions for a source.

After the M notional signatures of the source have been determined, the far-field signature of the source at a point in the far field of the source may be obtained by superposing the notional signatures of the source elements. FIG. 20 shows an inner region 2002 called the "near field," which represents a region close to the source 1800 where the signature of the source wavefield varies due to overlapping signatures of the pressure waves generated separately by the source elements. By contrast, an outer region 2004 called the "far field," which represents a region away from the source 1800 where the signature of the source wavefield does not change significantly with distance from the source. The far field 2004 typically starts at distances greater than about $2d^2/\lambda$ from the center of the source, where d is a length dimension of the source, and $\lambda$ is the wavelength of the source wavefield generated by the source. Curve 2006 represents a notional boundary between the near field and the far field. FIG. 20 shows a point 2008 located in the far field 2004 with Cartesian coordinates (xa,ya,za). The far-field source signature of the source wavefield produced by the source 1800 at the point 2008 is computed by:

$$s(t, xa, ya, za) = \left[\sum_{i=1}^{N} \frac{1}{r_{ia}} p'_i\left(t - \frac{r_{ia}}{c}\right) + R' \sum_{i=1}^{N} \frac{1}{rg_{ia}} p'_i\left(t - \frac{rg_{ia}}{c}\right)\right] \quad (33)$$

where $r_{ia} = \sqrt{(xv_i - xa)^2 + (yv_i - ya)^2 + (zv_i - za)^2}$ is the distance from the ith source element 2010 to the point 2008; and $rg_{ia} = \sqrt{(xv_i - xa)^2 + (yv_i - ya)^2 + (zv_i + za)^2}$ is the distance from the ith virtual source element 2012 to the point 2008.

The second summation term in Equation (33) is an estimate of the ghost portion of the far-field source signature, and the first term is an estimate of the ghost-free portion of the far-field source signature, which is the estimated ghost-free source signature that may be computed according to:

$$s^{gf}(t, xa, ya, za) \approx \left[\sum_{i=1}^{N} \frac{1}{r_{ia}} p'_i\left(t - \frac{r_{ia}}{c}\right)\right] \quad (34)$$

A source-side pressure-ghost operator is computed for each of the N angles of reflection $\alpha_i$ by deconvolving the spectrum of the estimated ghost-free source signature $s^{gf}(\alpha_i)$ from the up-going pressure spectrum $_a^w P^{up}(\alpha_i)$:

$$G_{PS}(\alpha_i) = \frac{_a^w P^{up}(\alpha_i)}{S^{gf}(\alpha_i)} \quad (35)$$

where
$S^{gf}(\alpha_i)$ is the estimated ghost-free spectrum of $s^{gf}(\alpha_i)$ after transformation to the f-k domain.

The N source-side pressure-ghost operators are averaged to obtain an average source-side pressure-ghost operator:

$$G_{PS}^{ave}(P_N, V_{z,N}, S^{gf}) = \frac{1}{N} \sum_{i=1}^{N} G_{PS}(\alpha_i) \quad (36)$$

A source-side vertical velocity ghost operator is computed for each of the N angles of reflection $\alpha_i$ by deconvolving the spectrum of the estimated ghost-free source signature $s^{gf}(\alpha_i)$ from the up-going vertical velocity spectrum $_a^w V_z^{up}(\alpha_i)$:

$$G_{V_zS}(\alpha_i) = \frac{\rho c_a^w V_z^{up}(\alpha_i)}{\cos(\alpha_i/2) S^{gf}(\alpha_i)} \quad (37)$$

The N source-side vertical velocity ghost operators of Equation (37) are averaged to obtain an average source-side vertical velocity ghost operator:

$$G_{V_zS}^{ave}(P_N, V_{z,N}, S^{gf}) = \frac{1}{N} \sum_{i=1}^{N} G_{V_zS}(\alpha_i) \quad (38)$$

The average source-side pressure and vertical velocity ghost operators given by Equations (37) and (38) may be used to compute substantially ghost-free pressure and vertical velocity data in each of the N recording intervals. A substantially ghost-free pressure spectrum is computed in the i-th recording interval by deconvolving the average source-side pressure-ghost operator of Equation (28) from the up-going pressure spectrum:

$$^i P^{gf} = \frac{^i P^{up}}{G_{PS}^{ave}(P_N, V_{z,N}, S^{gf})} \quad (39)$$

The substantially ghost-free pressure spectrum $^i P^{gf}$ may be transformed from the f-k domain to the s-t domain to obtain a gather of substantially ghost-free pressure data $^i p^{gf}$. A substantially ghost-free vertical velocity spectrum is computed in the i-th recording interval by deconvolving the average source-side vertical velocity ghost operator of Equation (38) from the up-going vertical velocity spectrum:

$$^i V_z^{gf} = \frac{^i V_z^{up}}{G_{V_zS}^{ave}(P_N, V_{z,N}, S^{gf})} \quad (40)$$

The substantially ghost-free vertical velocity spectrum $^i V_z^{gf}$ may be transformed from the f-k domain to the s-t domain to obtain a gather of substantially ghost-free pressure data $^i v_z^{gf}$.

The average source-side pressure-ghost operator given by Equation (36) and the average receiver-side pressure-ghost operators given by Equation (5) may be convolved in the f-k domain to generate an average source/receiver-side pressure-ghost operator $$G_P^{ave}(P_N, V_{z,N}) G_{PS}^{ave}(P_N, V_{z,N}, S^{gf}) \quad (41)$$

A substantially ghost-free pressure spectrum may be computed in the i-th recording interval by deconvolving the average source/receiver-side pressure-ghost operator of Equation (41) from the pressure spectrum in order to generate a substantially ghost-free pressure spectrum:

$$^i P^{gf} = \frac{^i P}{G_P^{ave}(P_N, V_{z,N}) G_{PS}^{ave}(P_N, V_{z,N}, S^{gf})} \quad (42)$$

The substantially ghost-free pressure spectrum $^i P^{gf}$ may be transformed from the f-k domain to the s-t domain to obtain a gather of substantially ghost-free pressure data $^i p^{gf}$. In an alternative implementation, an average source/receiver pressure-ghost operator, $\tilde{G}_P^{ave}(P_N, V_{z,N}) G_{PS}^{ave}(P_N, V_{z,N}, S^{gf})$, may be computed by substituting the average receiver-side pressure-ghost operator of Equation (13).

The average source-side vertical velocity ghost operator given by Equation (38) and the average receiver-side vertical velocity ghost operators given by Equation (9) may be convolved in the f-k domain to generate an average source/receiver-side vertical velocity ghost operator $$G_{V_z}^{ave}(P_N, V_{z,N}) G_{V_zS}^{ave}(P_N, V_{z,N}, S^{gf}) \quad (43)$$

A substantially ghost-free vertical velocity spectrum may be computed in the i-th recording interval by deconvolving the average source/receiver-side vertical velocity ghost operator of Equation (43) from the vertical velocity spectrum in order to obtain a substantially ghost-free vertical velocity spectrum:

$$^iV_z^{gf} = \frac{^iV_z}{G_{V_z}^{ave}(P_N, V_{z,N})G_{V_zS}^{ave}(P_N, V_{z,N}, S^{gf})} \quad (44)$$

The substantially ghost-free vertical velocity spectrum $^iV_z^{gf}$ may be transformed from the f-k domain to the s-t domain to obtain a gather of substantially ghost-free vertical velocity data $^iv_z^{gf}$. In an alternative implementation, an average source/receiver vertical velocity ghost operator, $\hat{G}_{V_z}^{ave}(P_N, V_{z,N})G_{V_zS}^{ave}(P_N, V_{z,N}, S^{gf})$, may be computed by using the average receiver-side vertical velocity ghost operator of Equation (17).

FIGS. 21-27 show control-flow diagrams of methods to determine ghost operators that may be used to determine properties of a free surface and deghost pressure and vertical velocity data. In FIGS. 21-27, for the sake of brevity, the term "pressure (vertical velocity)" is used to represent operations represented by blocks that may be performed for pressure and/or vertical velocity data.

Figure 21:
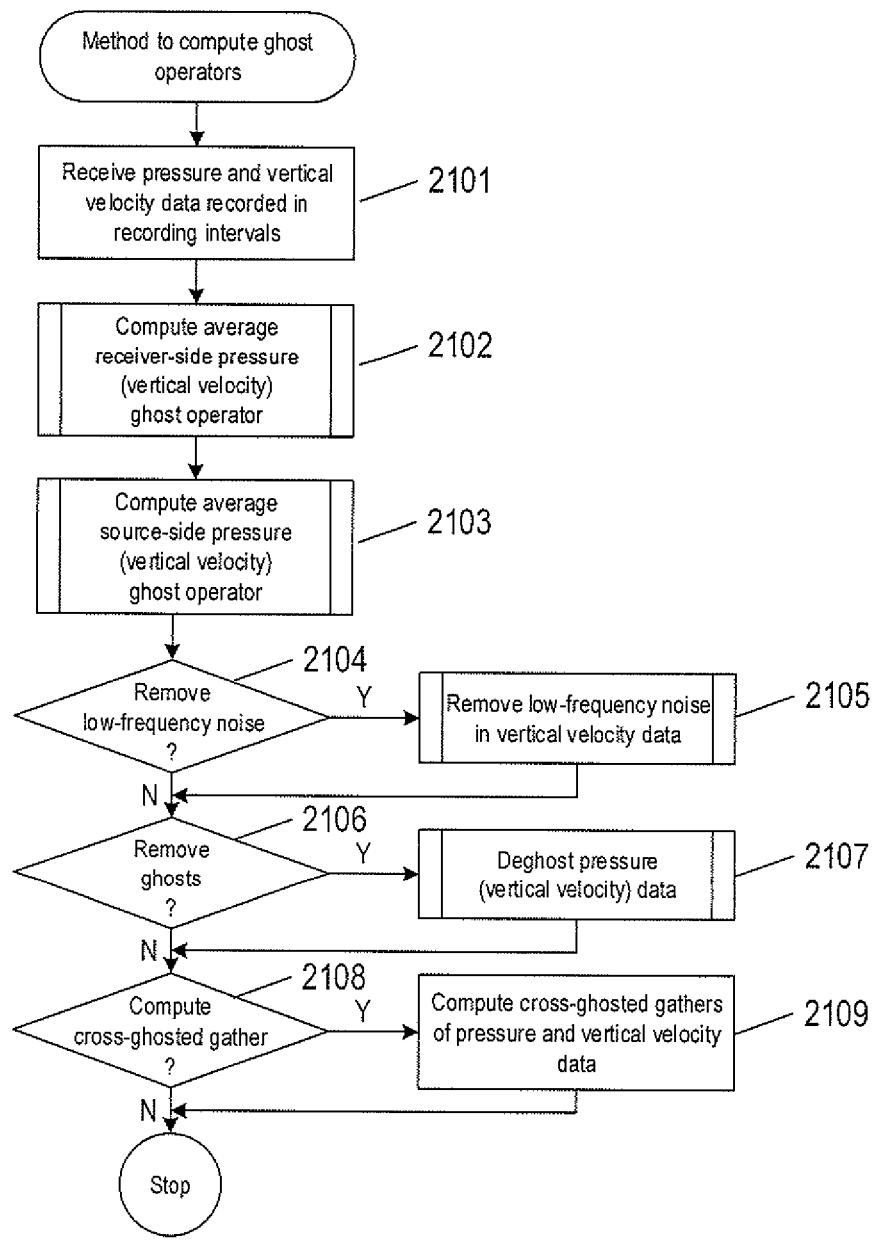
FIG. 21 shows a control-flow diagram of a method to compute ghost operators.

FIG. 21 shows a control-flow diagram of a method to compute ghost operators. In block 2101, pressure and vertical velocity data recorded in recording intervals are received, as described above with reference to FIG. 6. In block 2102, a routine "compute an average receiver-side pressure (vertical velocity) ghost operator" is called. The average receiver-side pressure (vertical velocity) ghost operator characterizes the free surface above the receivers. In block 2103, a routine "compute an average source-side pressure (vertical velocity) operator" is called. The average source-side pressure (vertical velocity) ghost operator characterizes the free surface above the source. In decision block 2104, when low-frequency noise will be removed from vertical velocity data, control flows to block 2105. In block 2105, a routine "remove low-frequency noise" is called to remove low-frequency from the vertical velocity data. In decision block 2106, when ghost are to be removed from pressure and/or vertical velocity data, control flows to block 2107. In block 2107, a routine "deghost pressure (vertical velocity) data" is called to deghost the pressure and/or vertical velocity data using the average receiver-side and source-side pressure (vertical velocity) operators obtained in blocks 2102 and 2103. In decision block 2108, when a cross-ghost gather will be computed, control flows to block 2109. In block 2109, a cross-ghosted pressure spectrum may be calculated from the average receiver-side vertical velocity ghost operator and the pressure data as described above with reference to Equation (25), and a cross-ghosted vertical velocity spectrum may be calculated from the average receiver-side pressure ghost operator and the vertical velocity data as described above with reference to Equation (26).

Figures 22, 23:
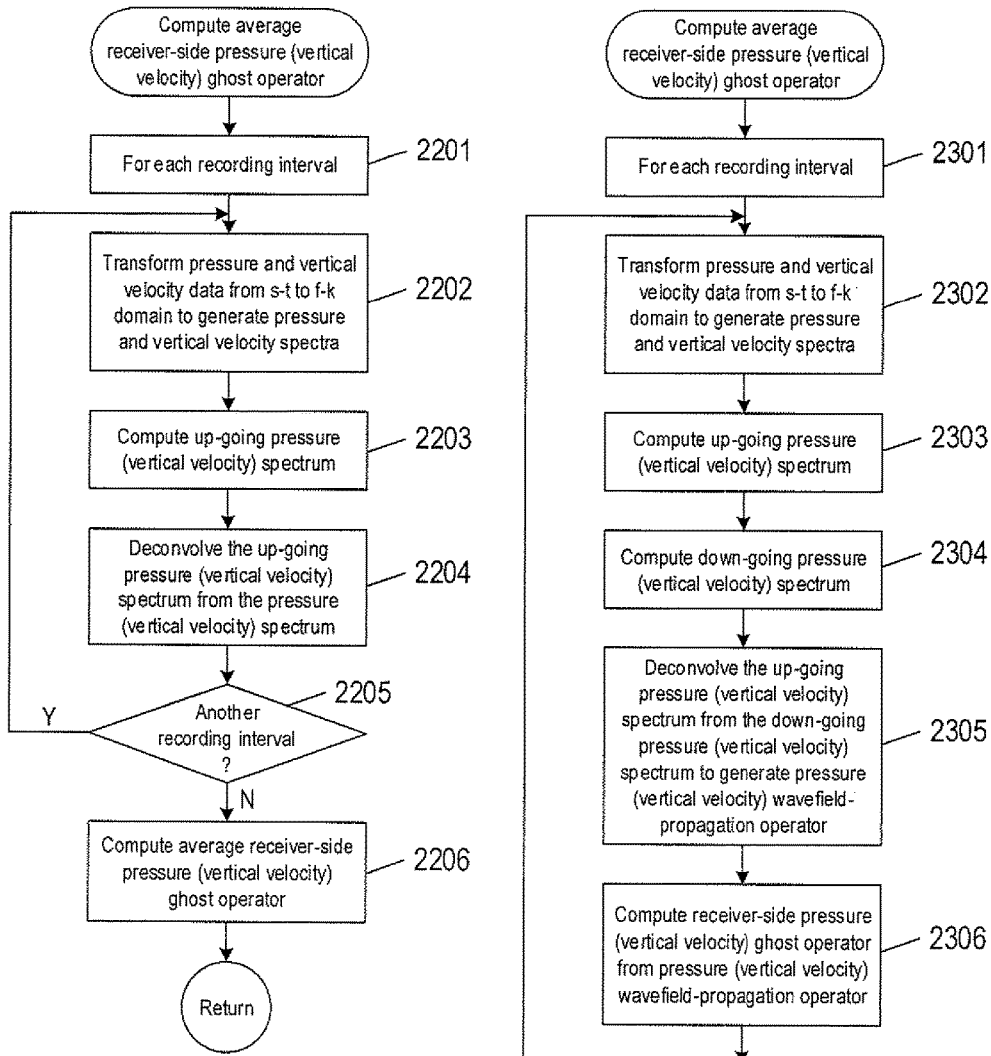
FIG. 22 shows a flow diagram of the routine "compute average receiver-side pressure (vertical velocity) ghost operator" called in FIG. 21.
FIG. 23 shows a flow diagram of the routine "compute average receiver-side pressure (vertical velocity) ghost operator" called in FIG. 21.

FIG. 22 shows a flow diagram of the routine "compute average receiver-side pressure (vertical velocity) ghost operator" called in block 2102 of FIG. 21. A for-loop beginning with block 2201 repeats the operations represented by blocks 2202-2204 for each recording interval. In block 2202, a pressure spectrum is computed from a gather of pressure data and a vertical velocity spectrum is computed from a gather of vertical velocity data using an FFT or a DFT, as described above with reference to FIG. 9. In block 2203, an up-going pressure spectrum may be computed from the gathers of pressure and vertical velocity data as described above with reference to Equation (3), and/or an up-going vertical velocity spectrum may be computed from the gathers of pressure and vertical velocity data as described above with reference to Equation (7). In block 2204, the up-going pressure spectrum is deconvolved from the pressure spectrum to generate a receiver-side pressure-ghost operator as described above with reference to Equation (4), and/or the up-going vertical velocity spectrum is deconvolved from the vertical velocity spectrum to generate a receiver-side vertical-velocity ghost operator as described above with reference to Equation (8). In decision block 2205, the operations represented by blocks 2202-2204 are repeated for another recording interval, otherwise control flows to block 2206. In block 2206, an average receiver-side pressure ghost operator is computed as described above with reference to Equation (5) and an average receiver-side vertical velocity ghost operator is computed as described above with reference to Equation (9).

FIG. 23 shows a flow diagram of the routine "compute average receiver-side pressure (vertical velocity) ghost operator" called in block 2102 of FIG. 21. A for-loop beginning with block 2301 repeats the operations represented by blocks 2302-2306 for each recording interval. In block 2302, a pressure spectrum is computed from a gather of pressure data and a vertical velocity spectrum is computed from a gather of vertical data using an FFT or a DFT as described above with reference to FIG. 10. In block 2303, an up-going pressure spectrum is computed from the gathers of pressure and vertical velocity data as described above with reference to Equation (3), or an up-going vertical velocity spectrum is computed from the gathers of pressure and vertical velocity data as described above with reference to Equation (7). In block 2304, a down-going pressure spectrum is computed from the gathers of pressure and vertical velocity data as described above with reference to Equation (10), or a down-going vertical velocity spectrum is computed from the gathers of pressure and vertical velocity data as described above with reference to Equation (14). In block 2305, the up-going pressure spectrum is deconvolved from the down-going pressure spectrum to generate a pressure wavefield-propagation operator as described above with reference to Equation (11), or the up-going vertical velocity spectrum is deconvolved from the down-going vertical velocity spectrum to generate a vertical velocity wavefield-propagation operator as described above with reference to Equation (15). In block 2306, a receiver-side pressure-ghost operator is computed from the pressure wavefield-propagation operator as described above with reference to Equation (12), or a receiver-side vertical velocity ghost operator is computed from the vertical-velocity wavefield-propagation operator as described above with reference to Equation (16). In decision block 2307, the operations represented by blocks 2302-2306 are repeated for another recording interval, otherwise control flows to block 2308. In block 2308, an average receiver-side pressure ghost operator is computed as described above with reference to Equation (5) and an average receiver-side vertical velocity ghost operator is computed as described above with reference to Equation (9).

Figure 24:
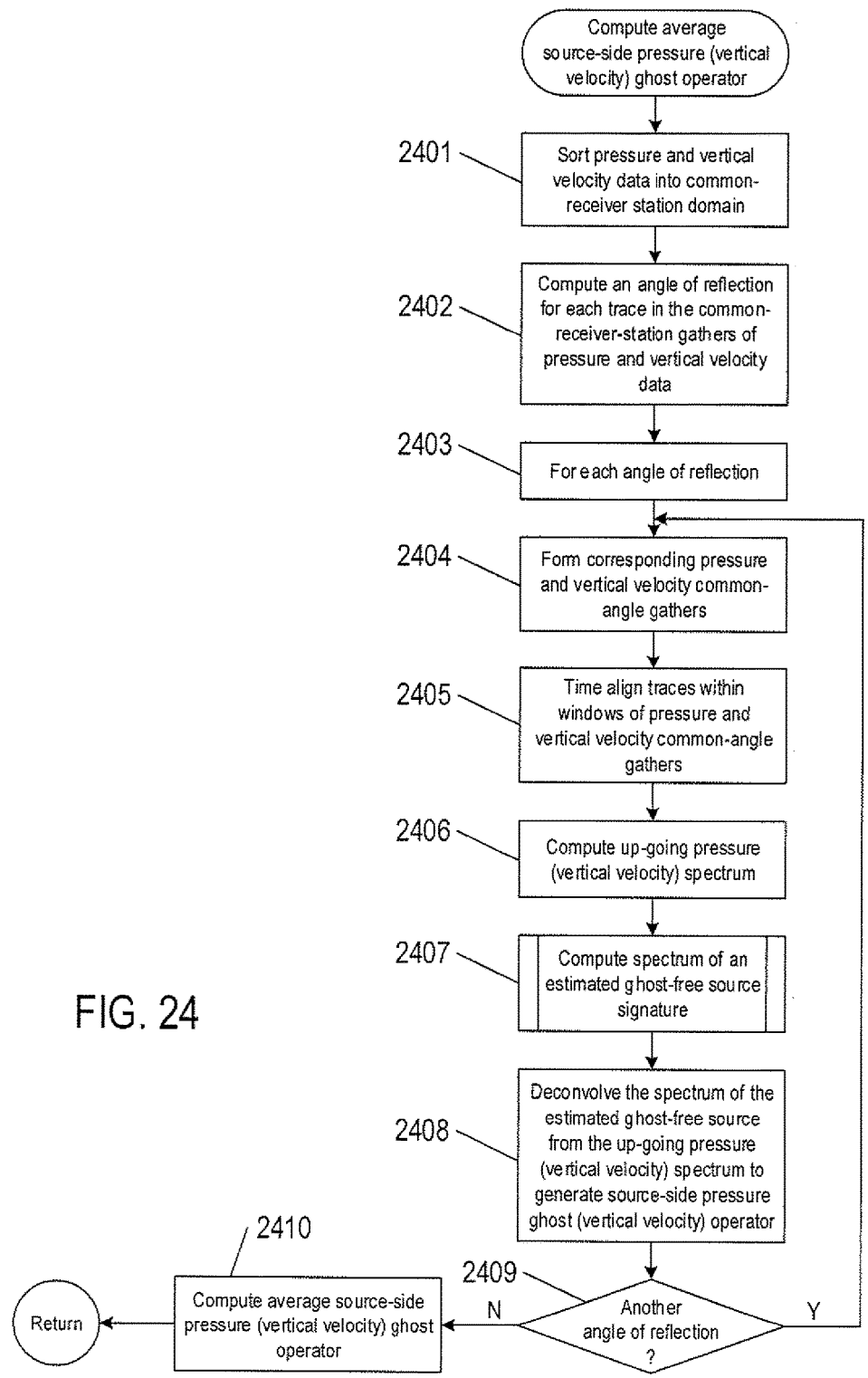
FIG. 24 shows a flow diagram of the routine "compute average source-side pressure (vertical velocity) ghost operator" called in FIG. 21.

FIG. 24 shows a flow diagram of the routine "compute average source-side pressure (vertical velocity) ghost operator" called in block 2103 of FIG. 21. In block 2401, the pressure and vertical velocity data received in block 2101 of FIG. 21 is sorted into a common-receiver-station domain to generate pressure and vertical velocity common-receiver-station gathers, as described above with reference to FIGS. 13 and 14A. In block 2402, an angle of reflection is computed for each trace in the pressure and vertical velocity common-receiver-station gathers. A for-loop beginning with block 2403, repeats the operations represented by blocks 2404-2408 for each angle of reflection. In block 2404, corresponding pressure and vertical velocity common-angle gathers are formed from traces in the pressure and vertical velocity common-receiver-station gathers that are associated with the substantially the same angle of reflection, as described above with reference to FIG. 15. In block 2404, windows that enclose same reflection event and associated ghost are applied to the corresponding pressure and vertical velocity common-angle gathers. The traces within the windows are aligned in time as described above with reference to FIG. 16. In block 2406, a time-aligned up-going pressure and time-aligned vertical velocity spectra are computed for time-aligned pressure and vertical velocity data in corresponding windows, as described above with reference to Equations (28) and (29). In block 2407, a routine "compute spectrum of an estimated ghost-free source signature" is called to compute a spectrum of an estimated ghost-free source signature in the f-k domain for the angle of reflection. In block 2408, the spectrum of the estimated ghost-free source signature is deconvolved from the time-aligned up-going pressure spectrum to generate a source-side pressure ghost operator, as described above with reference to Equation (35), and/or the spectrum of the estimated ghost-free source signature is deconvolved from the time-aligned up-going vertical velocity spectrum to generate a source-side vertical velocity ghost operator, as described above with reference to Equation (37). In decision block 2409, the operations represented by blocks 2404-2408 are repeated for another angle of reflection. In block 2410, an average source-side pressure (vertical velocity) ghost operator is computed from the source-side pressure (vertical velocity) ghost operators computed in block 2408, as described above with reference to Equations (36) and (38).

Figure 25:
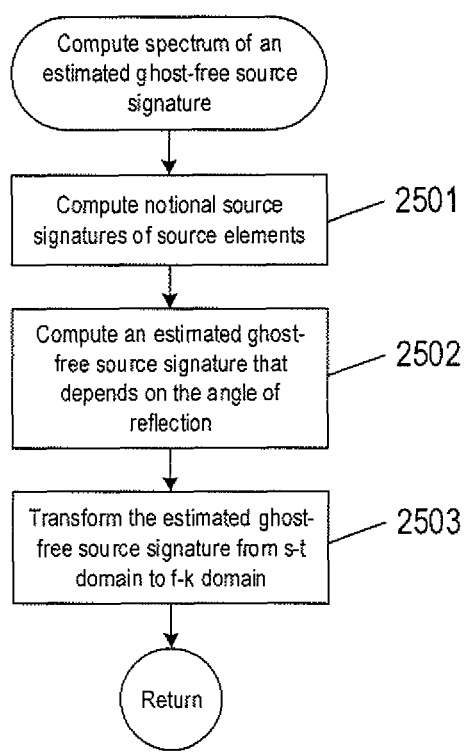
FIG. 25 shows flow diagram of the routine "compute spectrum of an estimated ghost-free source signature" called in FIG. 24.

FIG. 25 shows flow diagram of the routine "compute spectrum of an estimated ghost-free source signature" called in block 2407 of FIG. 24. In block 2501, notional source signatures of source elements of the source are computed as described above with reference to Equation (32). In block 2502, the notional source signatures may be used to compute an estimated ghost-free source signature as described above with reference to Equation (34). In block 2503, the estimated ghost-free source signature is transformed from the s-t domain to the f-k domain.

Figure 26:
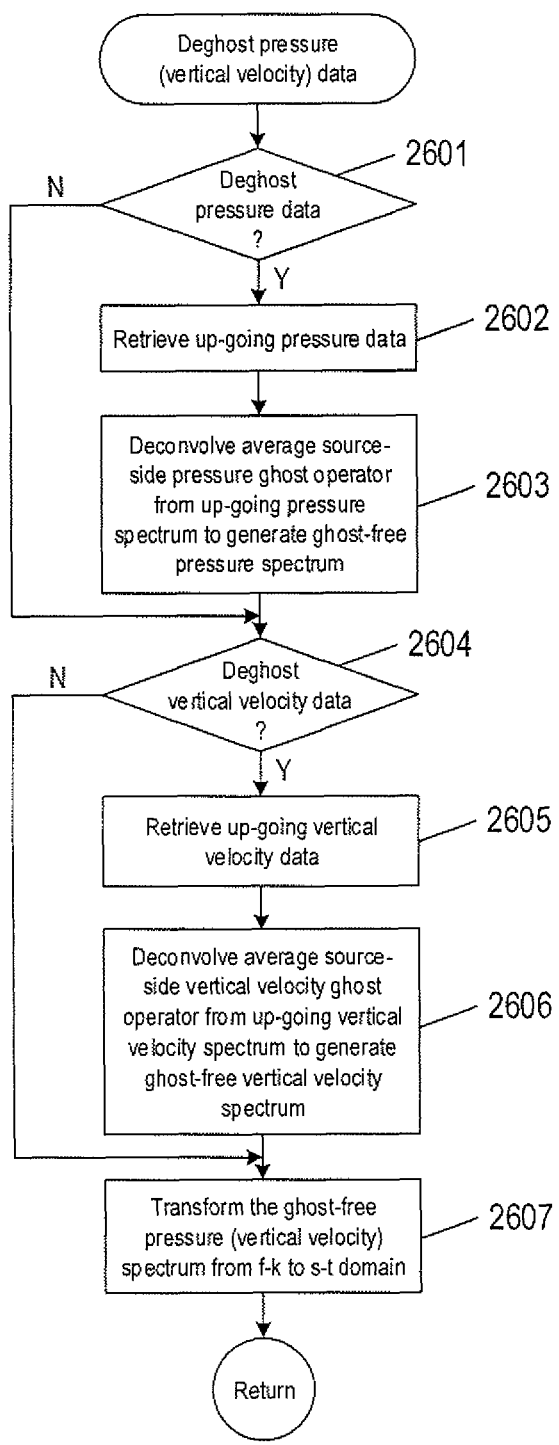
FIG. 26 shows a control-flow diagram of the routine "deghost pressure (vertical velocity) data" called in FIG. 21.

FIG. 26 shows a control-flow diagram of the routine "deghost pressure (vertical velocity) data" called in block 2105 of FIG. 21. In decision block 2601, when pressure data associate with a recording interval will be deghosted, control flows to block 2602. Otherwise, control flows to decision block 2604. In block 2602, the up-going pressure data associated with recording interval is retrieved from a data-storage device. In block 2603, the average source-side pressure ghost operator computed in block 2103 of FIG. 21 is deconvolved from the up-going pressure data to obtain a substantially ghost-free pressure spectrum, as described above with reference to Equation (39). In decision block 2604, when vertical velocity data associate with a recording interval will be deghosted, control flows to block 2605. Otherwise, control flows to block 2607. In block 2605, the up-going vertical velocity data for the recording interval is retrieved from a data-storage device. In block 2606, the average source-side vertical velocity ghost operator computed in block 2103 of FIG. 21 is deconvolved from the up-going vertical velocity data to obtain a substantially ghost-free vertical velocity spectrum, as described above with reference to Equation (40).

Figure 27:
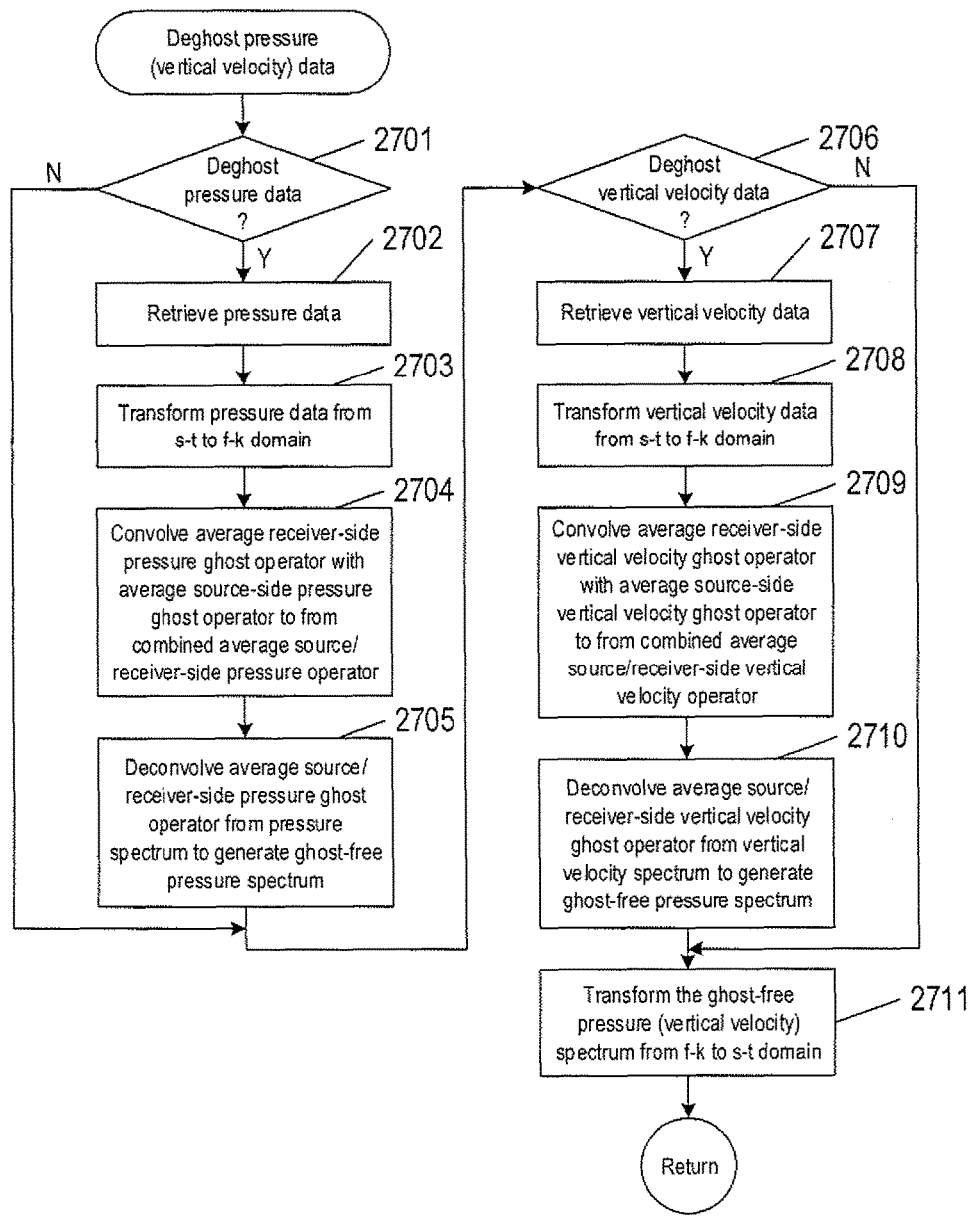
FIG. 27 shows a control-flow diagram of the routine "deghost pressure (vertical velocity) data" called in FIG. 21.

FIG. 27 shows a control-flow diagram of the routine "deghost pressure (vertical velocity) data" called in block 2105 of FIG. 21. In decision block 2701, when pressure data associate with a recording interval will be deghosted, control flows to block 2702. Otherwise, control flows to decision block 2706. In block 2702, the pressure data associated with a recording interval is retrieved from a data-storage device. In block 2702, the pressure data is transformed from the s-t domain to the f-k domain using an FFT or a DFT as describe above with reference to FIG. 9. In block 2704, the average source-side pressure-ghost operator computed in block 2103 of FIG. 21 and the average receiver-side pressure-ghost operators computed in block 2102 of FIG. 21 are convolved in the f-k domain to generate an average source/receiver-side pressure-ghost operator as described above with reference to Equation (41). In block 2705, the average source/receiver-side pressure-ghost operator is deconvolved from the pressure spectrum to generate a substantially ghost-free pressure spectrum. In block 2706, the vertical velocity data associated with a recording interval is retrieved from a data-storage device. In block 2707, the vertical velocity data is transformed from the s-t domain to the f-k domain using an FFT or a DFT as describe above with reference to FIG. 9. In block 2709, the average source-side vertical velocity ghost operator computed in block 2103 of FIG. 21 and the average receiver-side pressure-ghost operators computed in block 2102 of FIG. 21 are convolved in the f-k domain to generate an average source/receiver-side vertical velocity ghost operator as described above with reference to Equation (43). In block 2710, the average source/receiver-side pressure-ghost operator is deconvolved from the vertical velocity spectrum to generate a substantially ghost-free vertical velocity spectrum. In block 2711, the substantially ghost-free pressure spectrum and/or substantially ghost-free vertical velocity spectrum are transformed from the f-k domain to the s-t domain to generate substantially ghost-free pressure data and/or substantially ghost-free vertical velocity data.

Figure 28:
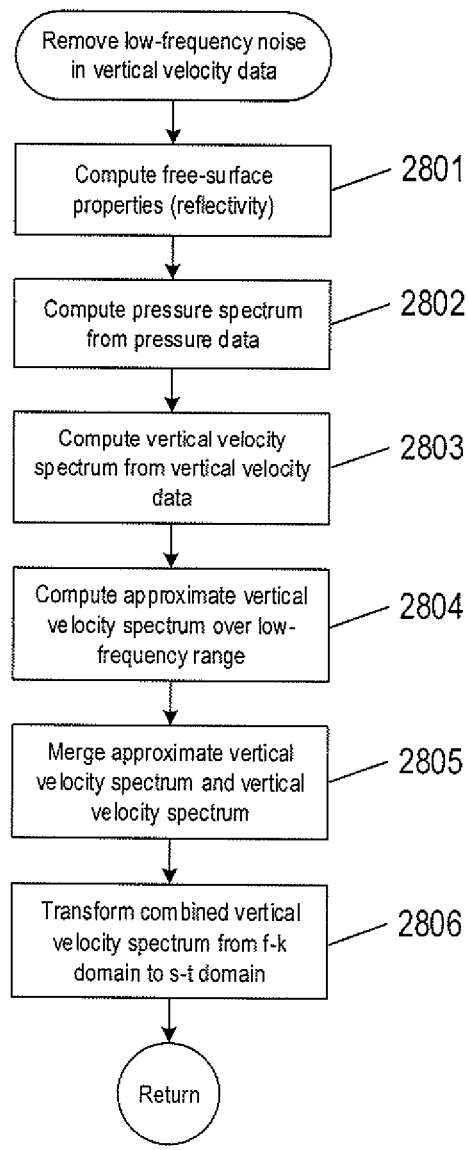
FIG. 28 shows a flow diagram of the routine "remove low-frequency noise in vertical velocity data" called in FIG. 21.

FIG. 28 shows a flow diagram of the routine "remove low-frequency noise in vertical velocity data" called in block 2111 of FIG. 21. In block 1801, free surface properties, such as the reflection coefficient, are calculated as described above with reference to Equation (19). In block 2802, a pressure spectrum is computed for a gather of pressure data. In block 2803, a vertical velocity spectrum is computed for a corresponding gather of vertical velocity data. In block 2804, an approximate vertical velocity spectrum is computed over a low-frequency range based on the reflection coefficient computed in block 2107 of FIG. 21 and according to Equation (21) described above. In block 2805, the approximate vertical velocity data is merged with the vertical velocity data to obtain a combined vertical velocity data as described above with reference to Equation (22). In block 2806, the combined vertical velocity data may be transformed from the f-k domain to the s-t domain to obtain a gather of vertical velocity data substantially free of low-frequency noise.

Figure 29:
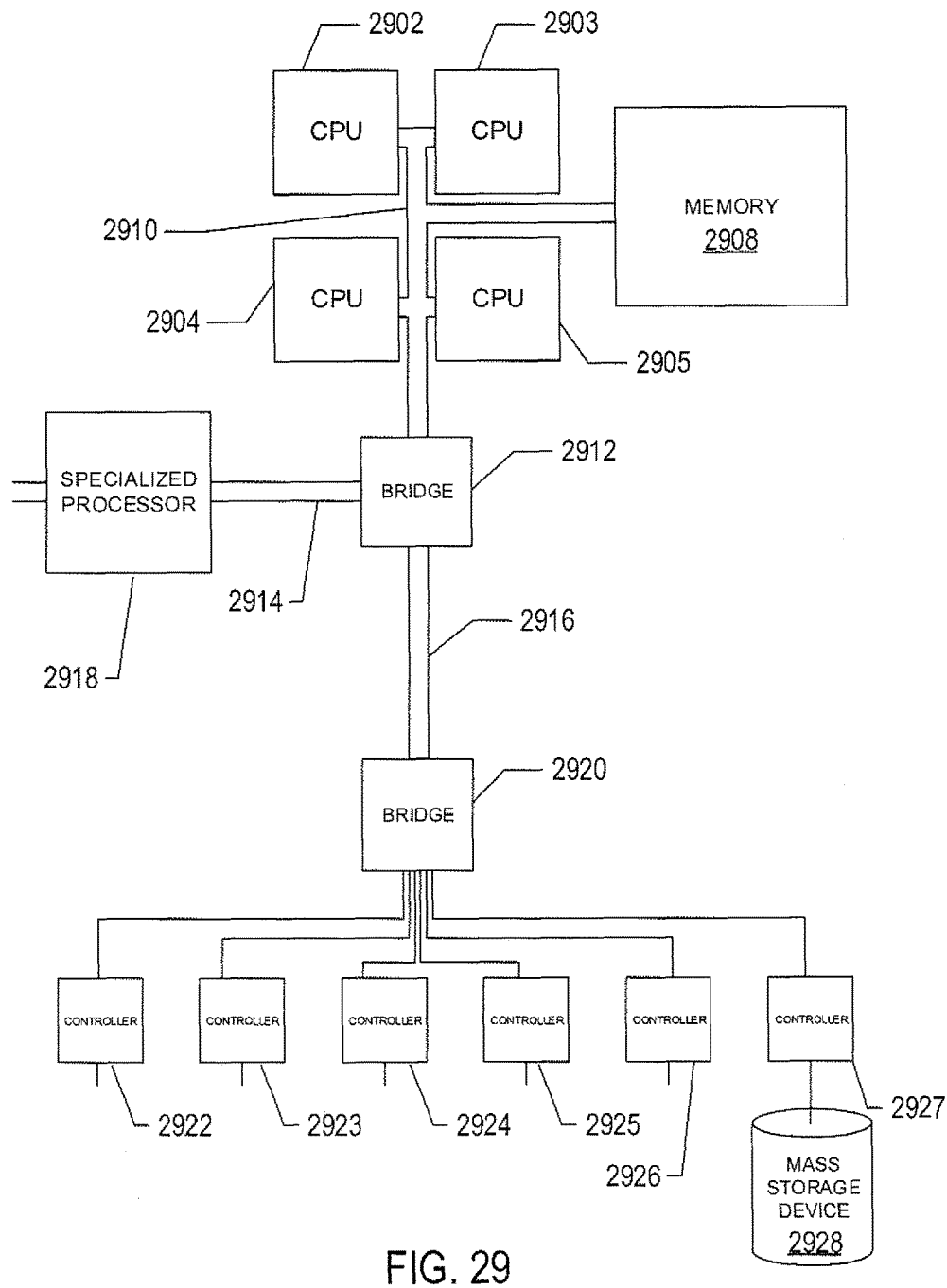
FIG. 29 shows an example of a computer system that executes efficient methods that extract free-surface information

FIG. 29 shows an example of a computer system that executes efficient methods that extract free-surface information and therefore represents a geophysical-analysis data-processing system. The internal components of many small, mid-sized, and large computer systems as well as specialized processor-based storage systems can be described with respect to this generalized architecture, although each particular system may feature many additional components, subsystems, and similar, parallel systems with architectures similar to this generalized architecture. The computer system contains one or multiple central processing units ("CPUs") 2902-2905, one or more electronic memories 2908 interconnected with the CPUs by a CPU/memory-subsystem bus 2910 or multiple busses, a first bridge 2912 that interconnects the CPU/memory-subsystem bus 2910 with additional busses 2914 and 2916, or other types of high-speed interconnection media, including multiple, high-speed serial interconnects. The busses or serial interconnections, in turn, connect the CPUs and memory with specialized processors 2918, such as a graphics processor, and with one or more additional bridges 2920, which are interconnected with high-speed serial links or with multiple controllers 2922-2927, such as controller 2927, that provide access to various different types of computer-readable media, such as computer-readable medium 2928, electronic displays, input devices, and other such components, subcomponents, and computational resources. The electronic displays, including visual display screen, audio speakers, and other output interfaces, and the input devices, including mice, keyboards, touch screens, and other such input interfaces, together constitute input and output interfaces that allow the computer system to interact with human users. Computer-readable medium 2928 is a data-storage device, including electronic memory, optical or magnetic disk drive, USB drive, flash memory and other such data-storage device. The computer-readable medium 2928 can be used to store machine-readable instructions that encode the computational methods described above and can be used to store encoded data, during store operations, and from which encoded data can be retrieved, during read operations, by computer systems, data-storage systems, and peripheral devices.

The mathematical formulas and gathers presented above are not, in any way, intended to mean or suggest an abstract idea or concept. The mathematical formulas and mathematical descriptions are used as a concise way of symbolically describing specific computational operations that may be performed on seismic data obtained from actual measuring devices (i.e., pressure sensors and particle motion sensors) deployed to measure actual wavefields generated during a marine survey. In general, the field of seismic data processing uses mathematical formulas and mathematical descriptions as a concise way to symbolically describe and represent computational operations performed on seismic data in order to obtain useful information about the earth's interior. The mathematical formulas and methods described above are ultimately implemented on physical computer hardware, data-storage devices, and communications systems in order to obtain results that also represent physical and concrete concepts of the earth's interior. For example, as explained above, a pressure wavefield emanating from a subterranean formation after being illuminated by a source wavefield is composed of actual physical pressure waves that are sampled using physical and concrete pressure and particle motion sensors. The pressure sensors in turn produce electrical or optical signals that encode pressure data that represents the pressure wavefield. The pressure data is physically recorded on data-storage devices and undergoes computational processing using hardware as describe above. The particle motion sensors in turn produce electrical or optical signals that encode particle displacement, velocity, or acceleration data that represents the particle displacement, velocity, or acceleration wavefield, respectively. The particle motion data is physically recorded on data-storage devices and undergoes computational processing using hardware as describe above. The cross-ghosted pressure data and vertical velocity data, reflection coefficient of the free surface, RMS height of the free surface, combined vertical velocity data, and deghosted pressure and vertical velocity data may be all be subjected to further seismic data processing in order to interpret the physical structure and composition of the subterranean formation, such as in monitoring production of, or locating, an actual hydrocarbon deposit within the earth.

The methods and systems disclosed herein may form a geophysical data product indicative of certain properties of a subterranean formation. The geophysical data product may include geophysical data such as pressure data, vertical velocity data, receiver-side ghost operators, source-side ghost operators, source/receiver-side ghost operators, cross-ghosted pressure data and vertical velocity data, reflection coefficient of the free surface, RMS height of the free surface, combined vertical velocity data, and deghosted pressure and vertical velocity data. The geophysical data product may be stored on a non-transitory computer-readable medium as described above. The geophysical data product may be produced offshore (i.e., by equipment on the survey vessel 102) or onshore (i.e., at a computing facility on land) either within the United States or in another country. When the geophysical data product is produced offshore or in another country, it may be imported onshore to a data-storage facility in the United States. Once onshore in the United States, geophysical analysis may be performed on the geophysical data product.

It is appreciated that the previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but will be accorded the widest scope consistent with the principles and novel features disclosed herein.

The invention claimed is:

1. A process to generate an image of a subterranean formation using marine seismic techniques in which a source is activated above the subterranean formation and the reflections from the subterranean formation are recorded as pressure and vertical velocity data generated by receivers, the specific improvement consisting of:
   computing one of an average receiver-side pressure ghost operator and an average receiver-side vertical velocity ghost operator from the pressure and vertical velocity data recorded in two or more recording intervals;
   sorting the pressure and vertical velocity data recorded in the two or more recording intervals into common-receiver-station gathers of pressure and vertical velocity data;
   computing one of an average source-side pressure ghost operator and an average source-side vertical velocity ghost operator from the common-receiver-station gathers of pressure and vertical velocity data;
   applying the one or more of the average receiver-side pressure and vertical velocity ghost operators and the average source-side pressure and vertical velocity ghost operators to one of the pressure and vertical velocity data to generate one of ghost-free pressure data and ghost-free vertical velocity data; and
   generating an image of a subterranean formation using one of the ghost-free pressure and ghost-free vertical velocity data.

2. The process of claim 1, wherein computing one of the average receiver-side pressure ghost operator and the average receiver-side vertical velocity ghost operator further comprises:
   for each of the recording intervals,
      transforming the pressure and vertical velocity data from the space-time domain to the frequency-wavenumber domain to generate a pressure spectrum and a vertical velocity spectrum, computing one of an up-going pressure spectrum and an up-going vertical velocity spectrum from the pressure and vertical velocity spectra, and deconvolving one of the up-going pressure spectrum from the pressure data and the up-going vertical velocity spectrum from the vertical velocity data to generate one of a receiver-side pressure ghost operator and a receiver-side vertical velocity ghost operator; and computing one of an average receiver-side pressure ghost operator from the receiver-side pressure ghost operators and an average receiver-side vertical velocity ghost operator from the receiver-side vertical velocity ghost operators.

3. The process of claim 1, wherein computing one of the average receiver-side pressure ghost operator and the average receiver-side vertical velocity ghost operator further comprises:

for each of the recording intervals,
transforming the pressure and vertical velocity data from the space-time domain to the frequency-wavenumber domain to generate a pressure spectrum and a vertical velocity spectrum,
computing one of an up-going pressure spectrum and an up-going vertical velocity spectrum from the pressure and vertical velocity spectra,
computing one of a down-going pressure spectrum and a down-going vertical velocity spectrum from the pressure and vertical velocity spectra,
deconvolving one of the up-going pressure spectrum and up-going vertical velocity spectrum from one of the down-going pressure spectrum and down-going pressure spectrum to generate one of a pressure wavefield-propagation operator and a vertical velocity wavefield-propagation operator, and
computing one of a receiver-side pressure ghost operator and a receiver-side vertical velocity operator from one of the pressure wavefield-propagation operator and the vertical velocity wavefield-propagation operator; and computing one of an average receiver-side pressure ghost operator from the receiver-side pressure ghost operators and an average receiver-side vertical velocity ghost operator from the receiver-side vertical velocity ghost operators.

4. The process of claim 1, wherein computing one of the average source-side pressure ghost operator and the average source-side vertical velocity ghost operator further comprises:

computing an angle of reflection for each trace in the common-receiver-station gathers of pressure and vertical velocity data;

for each angle of reflection,
forming a pressure common-angle gather from traces in the common-receiver-station gathers associated with substantially the same angle of reflection,
forming a vertical velocity common-angle gather from traces in the common-receiver-station gathers associated with the angle of reflection,
time-aligning traces within windows of the pressure and vertical velocity common-angle gathers, the windows encompassing a reflection event and associated ghosts,
computing a pressure spectrum and a vertical velocity spectrum of the pressure and vertical velocity data,
computing one of an up-going pressure spectrum and an up-going vertical velocity spectrum,
computing spectrum of an estimated ghost-free source in frequency-wavenumber domain, and
deconvolving the spectrum of the estimated ghost-free source from one of the up-going pressure spectrum and the up-going vertical velocity spectrum to generate one of a source-side pressure ghost operator and a source-side vertical velocity ghost operator; and computing one of an average source-side pressure ghost operator and an average source-side vertical velocity ghost operator from the source-side pressure ghost operators and source-side vertical velocity ghost operators.

5. The process of claim 1, wherein removing noise in one of the pressure and vertical velocity data further comprises:
computing a reflection coefficient from one of the average receiver-side pressure and vertical velocity ghost operators and an average receiver depth;
computing an approximate vertical velocity spectrum over a low-frequency range from the pressure spectrum and the reflection coefficient; and
merging the approximate vertical velocity spectrum over the low-frequency range with the vertical velocity spectrum over frequencies above the low-frequency range to generate a combined vertical velocity spectrum free of low-frequency noise in the low-frequency range.

6. The process of claim 1, wherein removing noise in one of the pressure and vertical velocity data further comprises:
computing up-going pressure spectrum from the pressure data recorded in one of the recording intervals;
deconvolving the average source-side pressure ghost operator from the up-going pressure spectrum to generate a ghost-free pressure spectrum of the pressure data;
computing up-going vertical velocity spectrum from the vertical velocity data recorded in one of the recording intervals;
deconvolving the average source-side vertical velocity ghost operator from the up-going vertical velocity spectrum to generate a ghost-free vertical velocity spectrum of the vertical velocity data; and
transfoiming one of ghost-free pressure and vertical velocity spectra from the frequency-wavenumber domain to generate one of ghost-free pressure and vertical velocity data.

7. The process of claim 1, wherein removing noise in one of the pressure and vertical velocity data further comprises:
transforming the pressure data recorded in one of the recording intervals from the space-time domain to the frequency-wavenumber domain to generate a pressure spectrum of the pressure data;
convolving the average source-side pressure ghost operator and the average receiver-side pressure ghost operator to generate an average source/receiver-side pressure ghost operator;
deconvolving the average source/receiver-side pressure ghost operator from the pressure spectrum to generate a ghost-free pressure spectrum of the pressure data;
transforming the vertical velocity data recorded in one of the recording intervals from the space-time domain to the frequency-wavenumber domain to generate a vertical velocity spectrum of the vertical velocity data;
convolving the average source-side vertical velocity ghost operator and the average receiver-side vertical velocity ghost operator to generate an average source/receiver-side vertical velocity ghost operator;

deconvolving the average source/receiver-side vertical velocity ghost operator from the vertical velocity spectrum to generate a ghost-free vertical velocity spectrum of the vertical velocity data; and transforming one of ghost-free pressure and vertical velocity spectra from the frequency-wavenumber domain to generate one of ghost-free pressure and vertical velocity data.

8. The process of claim 1, wherein the average receiver-side pressure and vertical velocity ghost operators and the average source-side pressure and vertical velocity ghost operators form geophysical data products, and further comprising recording the geophysical data products on a physical, non-volatile computer-readable medium suitable for importing onshore.

9. A system to determine ghost operators from pressure and vertical velocity data recorded in two or more recording intervals of a marine seismic survey, the system comprising:
one or more processors;
one or more data-storage devices; and
machine-readable instructions stored in the one or more data-storage devices that when executed using the one or more processors controls the system to carry out
computing one of an average receiver-side pressure ghost operator and an average receiver-side vertical velocity ghost operator from the pressure and vertical velocity data recorded in two or more recording intervals;
sorting the pressure and vertical velocity data recorded in the two or more recording intervals into common-receiver-station gathers of pressure and vertical velocity data;
computing one of an average source-side pressure ghost operator and an average source-side vertical velocity ghost operator from the common-receiver-station gathers of pressure and vertical velocity data;
applying the one or more of the average receiver-side pressure and vertical velocity ghost operators and the average source-side pressure and vertical velocity ghost operators to one of the pressure and vertical velocity data to generate one of ghost-free pressure data and ghost-free vertical velocity data; and
generating an image of a subterranean formation using one of the ghost-free pressure and ghost-free vertical velocity data.

10. The system of claim 9, wherein computing one of the average receiver-side pressure ghost operator and the average receiver-side vertical velocity ghost operator further comprises:
for each of the recording interval,
transforming the pressure and vertical velocity data from the space-time domain to the frequency-wavenumber domain to generate a pressure spectrum and a vertical velocity spectrum,
computing one of an up-going pressure spectrum and an up-going vertical velocity spectrum from the pressure and vertical velocity spectra, and
deconvolving one of the up-going pressure spectrum from the pressure data and the up-going vertical velocity spectrum from the vertical velocity data to generate one of a receiver-side pressure ghost operator and a receiver-side vertical velocity ghost operator; and
computing one of an average receiver-side pressure ghost operator from the receiver-side pressure ghost operators and an average receiver-side vertical velocity ghost operator from the receiver-side vertical velocity ghost operators.

11. The system of claim 9, wherein computing one of the average receiver-side pressure ghost operator and the average receiver-side vertical velocity ghost operator further comprises:
for each of the recording intervals,
transforming the pressure and vertical velocity data from the space-time domain to the frequency-wavenumber domain to generate a pressure spectrum and a vertical velocity spectrum,
computing one of up-going pressure spectrum and up-going vertical velocity spectrum from the pressure and vertical velocity spectra,
computing one of down-going pressure spectrum and down-going vertical velocity spectrum from the pressure and vertical velocity spectra,
deconvolving one of the up-going pressure spectrum and up-going vertical velocity spectrum from one of the down-going pressure spectrum and down-going pressure spectrum to generate one or a pressure wavefield-propagation operator and a vertical velocity wavefield-propagation operator, and
computing one of a receiver-side pressure ghost operator and a receiver-side vertical velocity operator from one of the pressure wavefield-propagation operator and the vertical velocity wavefield-propagation operator; and
computing one of an average receiver-side pressure ghost operator from the receiver-side pressure ghost operators and an average receiver-side vertical velocity ghost operator from the receiver-side vertical velocity ghost operators.

12. The system of claim 9, wherein computing one of the average source-side pressure ghost operator and the average source-side vertical velocity ghost operator further comprises:
computing an angle of reflection for each trace in the common-receiver-station gathers of pressure and vertical velocity data;
for each angle of reflection,
forming a pressure common-angle gather from traces in the common-receiver-station gathers associated with substantially the same angle of reflection,
forming a vertical velocity common-angle gather from traces in the common-receiver-station gathers associated with the angle of reflection,
time-aligning traces within windows of the pressure and vertical velocity common-angle gathers, the windows encompassing a reflection event and associated ghosts,
computing a pressure spectrum and a vertical velocity spectrum of the pressure and vertical velocity data,
computing one of an up-going pressure spectrum and an up-going vertical velocity spectrum,
computing spectrum of an estimated ghost-free source in frequency-wavenumber domain, and
deconvolving the spectrum of the estimated ghost-free source from one of the up-going pressure spectrum and the up-going vertical velocity spectrum to generate one of source-side pressure ghost operator and a source-side vertical velocity ghost operator; and
computing one of an average source-side pressure ghost operator and an average source-side vertical velocity ghost operator from the source-side pressure ghost operators and source-side vertical velocity ghost operators.

13. The system of claim 9, wherein removing noise in one of the pressure and vertical velocity data further comprises:
computing a reflection coefficient from one of the average receiver-side pressure and vertical velocity ghost operators and an average receiver depth;
computing an approximate vertical velocity spectrum over a low-frequency range from the pressure spectrum and the reflection coefficient; and
merging the approximate vertical velocity spectrum over the low-frequency range with the vertical velocity spectrum over frequencies above the low-frequency range to generate a combined vertical velocity spectrum free of low-frequency noise in the low-frequency range.

14. The system of claim 9, wherein removing noise in one of the pressure and vertical velocity data further comprises:
computing up-going pressure spectrum from the pressure data recorded in one of the recording intervals;
deconvolving the average source-side pressure ghost operator from the up-going pressure spectrum to generate a ghost-free pressure spectrum of the pressure data;
computing up-going vertical velocity spectrum from the vertical velocity data recorded in one of the recording intervals;
deconvolving the average source-side vertical velocity ghost operator from the up-going vertical velocity spectrum to generate a ghost-free vertical velocity spectrum of the vertical velocity data; and
transforming one of ghost-free pressure and vertical velocity spectra from the frequency-wavenumber domain to generate one of ghost-free pressure and vertical velocity data.

15. The system of claim 9, wherein removing noise in one of the pressure and vertical velocity data further comprises:
transforming the pressure data recorded in one of the recording intervals from the space-time domain to the frequency-wavenumber domain to generate a pressure spectrum of the pressure data;
convolving the average source-side pressure ghost operator and the average receiver-side pressure ghost operator to generate an average source/receiver-side pressure ghost operator;
deconvolving the average source/receiver-side pressure ghost operator from the pressure spectrum to generate a ghost-free pressure spectrum of the pressure data;
transforming the vertical velocity data recorded in one of the recording intervals from the space-time domain to the frequency-wavenumber domain to generate a vertical velocity spectrum of the vertical velocity data;
convolving the average source-side vertical velocity ghost operator and the average receiver-side vertical velocity ghost operator to generate an average source/receiver-side vertical velocity ghost operator;
deconvolving the average source/receiver-side vertical velocity ghost operator from the vertical velocity spectrum to generate a ghost-free vertical velocity spectrum of the vertical velocity data; and
transforming one of ghost-free pressure and vertical velocity spectra from the frequency-wavenumber domain to generate one of ghost-free pressure and vertical velocity data.

16. A non-transitory computer-readable medium encoded with machine-readable instructions that implement a method carried out by one or more processors of a computer system to perform the operations of
computing one of an average receiver-side pressure ghost operator and an average receiver-side vertical velocity ghost operator from the pressure and vertical velocity data recorded in two or more recording intervals;
sorting the pressure and vertical velocity data recorded in the two or more recording intervals into common-receiver-station gathers of pressure and vertical velocity data;
computing one of an average source-side pressure ghost operator and an average source-side vertical velocity ghost operator from the common-receiver-station gathers of pressure and vertical velocity data;
applying the one or more of the average receiver-side pressure and vertical velocity ghost operators and the average source-side pressure and vertical velocity ghost operators to one of the pressure and vertical velocity data to generate one of ghost-free pressure data and ghost-free vertical velocity data; and
generating an image of a subterranean formation using one of the ghost-free pressure and ghost-free vertical velocity data.

17. The system of claim 16, wherein computing one of the average receiver-side pressure ghost operator and the average receiver-side vertical velocity ghost operator further comprises:
for each of the recording intervals,
transforming the pressure and vertical velocity data from the space-time domain to the frequency-wavenumber domain to generate a pressure spectrum and a vertical velocity spectrum,
computing one of an up-going pressure spectrum and up-going vertical velocity spectrum from the pressure and vertical velocity spectra, and
deconvolving one of the up-going pressure spectrum from the pressure data and the up-going vertical velocity spectrum from the vertical velocity data to generate one of a receiver-side pressure ghost operator and a receiver-side vertical velocity ghost operator; and
computing one of an average receiver-side pressure ghost operator from the receiver-side pressure ghost operators and an average receiver-side vertical velocity ghost operator from the receiver-side vertical velocity ghost operators.

18. The system of claim 16, wherein computing one of the average receiver-side pressure ghost operator and the average receiver-side vertical velocity ghost operator further comprises:
for each of the recording intervals,
transforming the pressure and vertical velocity data from the space-time domain to the frequency-wavenumber domain to generate a pressure spectrum and a vertical velocity spectrum,
computing one of an up-going pressure spectrum and an up-going vertical velocity spectrum from the pressure and vertical velocity spectra,
computing one of a down-going pressure spectrum and a down-going vertical velocity spectrum from the pressure and vertical velocity spectra,
deconvolving one of the up-going pressure spectrum and up-going vertical velocity spectrum from one of the down-going pressure spectrum and down-going pressure spectrum to generate one of a pressure wavefield-propagation operator and a vertical velocity wavefield-propagation operator, and computing one of a receiver-side pressure ghost operator and a receiver-side vertical velocity operator from one of the pressure wavefield-propagation operator and the vertical velocity wavefield-propagation operator; and computing one of an average receiver-side pressure ghost operator from the receiver-side pressure ghost operators and an average receiver-side vertical velocity ghost operator from the receiver-side vertical velocity ghost operators.

19. The system of claim 16, wherein computing one of the average source-side pressure ghost operator and the average source-side vertical velocity ghost operator further comprises:

computing an angle of reflection for each trace in the common-receiver-station gathers of pressure and vertical velocity data;

for each angle of reflection,
forming a pressure common-angle gather from traces in the common-receiver-station gathers associated with substantially the same angle of reflection,
forming a vertical velocity common-angle gather from traces in the common-receiver-station gathers associated with the angle of reflection,
time-aligning traces within windows of the pressure and vertical velocity common-angle gathers, the windows encompassing a reflection event and associated ghosts,
computing a pressure spectrum and a vertical velocity spectrum of the pressure and vertical velocity data,
computing one of an up-going pressure spectrum and an up-going vertical velocity spectrum,
computing spectrum of an estimated ghost-free source in frequency-wavenumber domain, and
deconvolving the spectrum of the estimated ghost-free source from one of the up-going pressure spectrum and the up-going vertical velocity spectrum to generate one of source-side pressure ghost operator and source-side vertical velocity ghost operator; and computing one of an average source-side pressure ghost operator and an average source-side vertical velocity ghost operator from the source-side pressure ghost operators and source-side vertical velocity ghost operators.

20. The system of claim 16, wherein removing noise in one of the pressure and vertical velocity data further comprises:

computing a reflection coefficient from one of the average receiver-side pressure and vertical velocity ghost operators and an average receiver depth;

computing an approximate vertical velocity spectrum over a low-frequency range from the pressure spectrum and the reflection coefficient; and merging the approximate vertical velocity spectrum over the low-frequency range with the vertical velocity spectrum over frequencies above the low-frequency range to generate a combined vertical velocity spectrum free of low-frequency noise in the low-frequency range.

21. The system of claim 16, wherein removing noise in one of the pressure and vertical velocity data further comprises:

computing up-going pressure spectrum from the pressure data recorded in one of the recording intervals;

deconvolving the average source-side pressure ghost operator from the up-going pressure spectrum to generate a ghost-free pressure spectrum of the pressure data;

computing up-going vertical velocity spectrum from the vertical velocity data recorded in one of the recording intervals;

deconvolving the average source-side vertical velocity ghost operator from the up-going vertical velocity spectrum to generate a ghost-free vertical velocity spectrum of the vertical velocity data; and transforming one of ghost-free pressure and vertical velocity spectra from the frequency-wavenumber domain to generate one of ghost-free pressure and vertical velocity data.

22. The system of claim 16, wherein removing noise in one of the pressure and vertical velocity data further comprises:

transforming the pressure data recorded in one of the recording intervals from the space-time domain to the frequency-wavenumber domain to generate a pressure spectrum of the pressure data;

convolving the average source-side pressure ghost operator and the average receiver-side pressure ghost operator to generate an average source/receiver-side pressure ghost operator;

deconvolving the average source/receiver-side pressure ghost operator from the pressure spectrum to generate a ghost-free pressure spectrum of the pressure data;

transforming the vertical velocity data recorded in one of the recording intervals from the space-time domain to the frequency-wavenumber domain to generate a vertical velocity spectrum of the vertical velocity data;

convolving the average source-side vertical velocity ghost operator and the average receiver-side vertical velocity ghost operator to generate an average source/receiver-side vertical velocity ghost operator;

deconvolving the average source/receiver-side vertical velocity ghost operator from the vertical velocity spectrum to generate a ghost-free vertical velocity spectrum of the vertical velocity data; and transforming one of ghost-free pressure and vertical velocity spectra from the frequency-wavenumber domain to generate one of ghost-free pressure and vertical velocity data.

\* \* \* \* \*